US011159114B2

(12) United States Patent
Jore et al.

(10) Patent No.: US 11,159,114 B2
(45) Date of Patent: Oct. 26, 2021

(54) ELECTRONIC TRANSMISSION SYSTEM

(71) Applicant: Montana Technologies, LLC, Ronan, MT (US)

(72) Inventors: Matthew B. Jore, Ronan, MT (US); Daniel Albert Gabig, Polson, MT (US); James Douglas Jore, Polson, MT (US)

(73) Assignee: MONTANA TECHNOLOGIES LLC, Ronan, MT (US)

(*) Notice: Subject to any disclaimer, the term of this patent is extended or adjusted under 35 U.S.C. 154(b) by 299 days.

(21) Appl. No.: 16/071,318

(22) PCT Filed: Jan. 19, 2017

(86) PCT No.: PCT/US2017/014152
§ 371 (c)(1),
(2) Date: Jul. 19, 2018

(87) PCT Pub. No.: WO2017/127557
PCT Pub. Date: Jul. 27, 2017

(65) Prior Publication Data
US 2021/0211083 A1   Jul. 8, 2021

Related U.S. Application Data

(60) Provisional application No. 62/281,213, filed on Jan. 21, 2016, provisional application No. 62/280,902, (Continued)

(51) Int. Cl.
*H02J 7/04* (2006.01)
*H02P 25/18* (2006.01)
(Continued)

(52) U.S. Cl.
CPC .............. *H02P 25/188* (2013.01); *B60L 7/14* (2013.01); *B60L 15/2009* (2013.01);
(Continued)

(58) Field of Classification Search
CPC .......... H02P 25/188; H02P 27/06; H02P 6/16; H02P 23/14; H02P 25/22; H02K 16/04;
(Continued)

(56) References Cited

U.S. PATENT DOCUMENTS

2009/0160392 A1   6/2009  Mularcik
2010/0072928 A1*  3/2010  Welchko ................. B60L 50/51
                                                      318/400.13
(Continued)

OTHER PUBLICATIONS

International Search Report and Written Opinion for PCT/US2017/014152 dated Apr. 14, 2017.

*Primary Examiner* — Muhammad S Islam
(74) *Attorney, Agent, or Firm* — McClure, Qualey & Rodack, LLP

(57) ABSTRACT

In one embodiment, systems and methods of controlling switch modules for dynamically deriving selective circuitries within a plurality of similar voltage energy storage devices of an energy storage system, and/or, within a plurality of stators of a motor/generator, or a plurality of stators of system of motors/generators, thereby optimizing the utilization of energy stored, consumed, and regenerated in the operation of a vehicle.

12 Claims, 11 Drawing Sheets

Related U.S. Application Data filed on Jan. 20, 2016, provisional application No. 62/280,145, filed on Jan. 19, 2016.

(51) Int. Cl.
| | |
|---|---|
| *H02P 27/06* | (2006.01) |
| *H02P 6/16* | (2016.01) |
| *H02P 23/14* | (2006.01) |
| *H02P 25/22* | (2006.01) |
| *B60L 7/14* | (2006.01) |
| *H02K 16/04* | (2006.01) |
| *H02J 7/00* | (2006.01) |
| *B60L 15/20* | (2006.01) |
| *B60L 50/60* | (2019.01) |

(52) U.S. Cl.
CPC ............ *B60L 50/60* (2019.02); *H02J 7/0047* (2013.01); *H02J 7/0063* (2013.01); *H02K 16/04* (2013.01); *H02P 6/16* (2013.01); *H02P 23/14* (2013.01); *H02P 25/22* (2013.01); *H02P 27/06* (2013.01)

(58) Field of Classification Search
CPC ......... H02J 7/0047; H02J 7/0063; B60L 7/14; B60L 50/60; B60L 15/2009
See application file for complete search history.

(56) References Cited

U.S. PATENT DOCUMENTS

| | | |
|---|---|---|
| 2011/0227523 A1 | 9/2011 | Grantz |
| 2012/0239237 A1* | 9/2012 | Hashimoto ........... B60W 20/15 701/22 |
| 2014/0125264 A1 | 5/2014 | Nakamura et al. |

* cited by examiner

TABLE 1

|  | ALL 6 STATORS IN SERIES | 3 STATORS IN SERIES PARALLEL TO 3 STATORS IN SERIES | 2 STATORS IN SERIES PARALLEL TO 2 STATORS IN SERIES PARALLEL TO 2 STATORS IN SERIES | ALL SIX STATORS IN PARALLEL |
|---|---|---|---|---|
| Y TERMINAL PHASE SWITCH MODULES: | | | | |
| Y1 | OPEN | OPEN | OPEN | CLOSED |
| Y2 | OPEN | OPEN | CLOSED | CLOSED |
| Y3 | OPEN | CLOSED | OPEN | CLOSED |
| Y4 | OPEN | OPEN | CLOSED | CLOSED |
| Y5 | OPEN | OPEN | OPEN | CLOSED |
| Y6 | CLOSED | CLOSED | CLOSED | CLOSED |
| PARALLEL CONNECTIVITY SWITCH MODULES: | | | | |
| P1 | CLOSED | CLOSED | CLOSED | CLOSED |
| P2 | OPEN | OPEN | OPEN | CLOSED |
| P3 | OPEN | OPEN | CLOSED | CLOSED |
| P4 | OPEN | CLOSED | OPEN | CLOSED |
| P5 | OPEN | OPEN | CLOSED | CLOSED |
| P6 | OPEN | OPEN | OPEN | CLOSED |
| SERIES CONNECTIVITY SWITCH MODULES: | | | | |
| S1 | CLOSED | CLOSED | CLOSED | OPEN |
| S2 | CLOSED | CLOSED | OPEN | OPEN |
| S3 | CLOSED | OPEN | CLOSED | OPEN |
| S4 | CLOSED | CLOSED | OPEN | OPEN |
| S5 | CLOSED | CLOSED | CLOSED | OPEN |

FIG. 3

TABLE 2

| | ALL 6 STATORS IN SERIES | 2 STATORS IN PARALLEL LINKED IN SERIES WITH 2 STATORS IN PARALLEL LINKED IN SERIES WITH 2 STATORS IN PARALLEL | 3 STATORS IN PARALLEL LINKED IN SERIES TO 3 STATORS IN PARALLEL | ALL SIX STATORS IN PARALLEL |
|---|---|---|---|---|
| SERIES SWITCH MODULES (FOR EACH PHASE): | | | | |
| S1 | CLOSED | OPEN | OPEN | OPEN |
| S2 | CLOSED | CLOSED | OPEN | OPEN |
| S3 | CLOSED | OPEN | CLOSED | OPEN |
| S4 | CLOSED | CLOSED | OPEN | OPEN |
| S5 | CLOSED | OPEN | OPEN | OPEN |
| PARALLEL SWITCH MODULES (FOR EACH PHASE): | | | | |
| P1 | OPEN | CLOSED | CLOSED | CLOSED |
| P2 | OPEN | CLOSED | CLOSED | CLOSED |
| P3 | OPEN | OPEN | CLOSED | CLOSED |
| P4 | OPEN | OPEN | CLOSED | CLOSED |
| P5 | OPEN | CLOSED | OPEN | CLOSED |
| P6 | OPEN | CLOSED | OPEN | CLOSED |
| P7 | OPEN | OPEN | CLOSED | CLOSED |
| P8 | OPEN | OPEN | CLOSED | CLOSED |
| P9 | OPEN | CLOSED | CLOSED | CLOSED |
| P10 | OPEN | CLOSED | CLOSED | CLOSED |
| TO ESTABLISH A WYE CONNECTIVITY (FOR EACH PHASE): | | | | |
| Y1 | CLOSED | CLOSED | CLOSED | CLOSED |
| Y2 | CLOSED | CLOSED | CLOSED | CLOSED |
| Y3 | CLOSED | CLOSED | CLOSED | CLOSED |
| H1 | OPEN | OPEN | OPEN | OPEN |
| H2 | OPEN | OPEN | OPEN | OPEN |
| H3 | OPEN | OPEN | OPEN | OPEN |
| TO ESTABLISH AN H BRIDGE CONNECTIVITY (FOR EACH PHASE): | | | | |
| Y1 | OPEN | OPEN | OPEN | OPEN |
| Y2 | OPEN | OPEN | OPEN | OPEN |
| Y3 | OPEN | OPEN | OPEN | OPEN |
| H1 | CLOSED | CLOSED | CLOSED | CLOSED |
| H2 | CLOSED | CLOSED | CLOSED | CLOSED |
| H3 | CLOSED | CLOSED | CLOSED | CLOSED |

FIG. 5

TABLE 3

| | ALL 6 STATORS IN SERIES | 2 STATORS IN PARALLEL LINKED IN SERIES WITH 2 STATORS IN PARALLEL LINKED IN SERIES WITH 2 STATORS IN PARALLEL | 3 STATORS IN PARALLEL LINKED IN SERIES TO 3 STATORS IN PARALLEL | ALL SIX STATORS IN PARALLEL |
|---|---|---|---|---|
| SERIES SWITCH MODULES (FOR EACH PHASE): | | | | |
| S1 | CLOSED | OPEN | OPEN | OPEN |
| S2 | CLOSED | CLOSED | OPEN | OPEN |
| S3 | CLOSED | OPEN | CLOSED | OPEN |
| S4 | CLOSED | CLOSED | OPEN | OPEN |
| S5 | CLOSED | OPEN | OPEN | OPEN |
| PARALLEL SWITCH MODULES (FOR EACH PHASE): | | | | |
| P1 | OPEN | CLOSED | CLOSED | CLOSED |
| P2 | OPEN | CLOSED | CLOSED | CLOSED |
| P3 | OPEN | OPEN | CLOSED | CLOSED |
| P4 | OPEN | OPEN | CLOSED | CLOSED |
| P5 | OPEN | CLOSED | OPEN | CLOSED |
| P6 | OPEN | CLOSED | OPEN | CLOSED |
| P7 | OPEN | OPEN | CLOSED | CLOSED |
| P8 | OPEN | OPEN | CLOSED | CLOSED |
| P9 | OPEN | CLOSED | CLOSED | CLOSED |
| P10 | OPEN | CLOSED | CLOSED | CLOSED |
| TO ESTABLISH A WYE CONNECTIVITY (FOR EACH PHASE): | | | | |
| Y1 | CLOSED | CLOSED | CLOSED | CLOSED |
| Y2 | CLOSED | CLOSED | CLOSED | CLOSED |
| Y3 | CLOSED | CLOSED | CLOSED | CLOSED |
| TO ESTABLISH AN H BRIDGE CONNECTIVITY (FOR EACH PHASE): | | | | |
| Y1 | OPEN | OPEN | OPEN | OPEN |
| Y2 | OPEN | OPEN | OPEN | OPEN |
| Y3 | OPEN | OPEN | OPEN | OPEN |

FIG. 7

| STATES | RELATIVE BEMF |
|---|---|
| 6 IN SERIES WITH Y | 100.0% |
| 6 IN SERIES WITH H | 58.0% |
| 3 IN SERIES: 3 IN SERIES WITH Y | 50.0% |
| 2 IN SERIES: 2 IN SERIES: 2 IN SERIES WITH Y | 33.3% |
| 3 IN SERIES: 3 IN SERIES WITH H | 29.0% |
| 2 IN SERIES: 2 IN SERIES: 2 IN SERIES WITH H | 19.0% |
| 6 IN PARALLEL WITH Y | 16.7% |
| 6 IN PARALLEL WITH H | 10.0% |

FIG. 8

TABLE 4

| BIDIRECTIONAL SWITCH MODULE # | DESIGNATED REFERENCE VALUE OF LOOK UP TABLE ONE ||||||||
|---|---|---|---|---|---|---|---|---|
| | 1 | 2 | 3 | 4 | 5 | 6 | 7 | 8 |
| | RECONFIGURATION OF STATOR CIRCUITRY ||||||||
| | 6S-Y | 6S-H | 2P3S-Y | 3P2S-Y | 2P3S-H | 3P2S-H | 6P-Y | 6P-H |
| S1 | 1 | 1 | 1 | 1 | 1 | 1 | 0 | 0 |
| S2 | 1 | 1 | 1 | 0 | 1 | 0 | 0 | 0 |
| S3 | 1 | 1 | 0 | 1 | 0 | 1 | 0 | 0 |
| S4 | 1 | 1 | 1 | 0 | 1 | 0 | 0 | 0 |
| S5 | 1 | 1 | 1 | 1 | 1 | 1 | 0 | 0 |
| P1 | 0 | 0 | 1 | 1 | 1 | 1 | 1 | 1 |
| P2 | 0 | 0 | 0 | 0 | 0 | 0 | 1 | 1 |
| P3 | 0 | 0 | 0 | 1 | 1 | 0 | 1 | 1 |
| P4 | 0 | 0 | 1 | 1 | 1 | 1 | 1 | 1 |
| P5 | 0 | 0 | 0 | 1 | 0 | 1 | 1 | 1 |
| P6 | 0 | 0 | 1 | 0 | 1 | 1 | 1 | 1 |
| P7 | 0 | 0 | 1 | 1 | 1 | 1 | 1 | 1 |
| P8 | 0 | 0 | 0 | 0 | 0 | 0 | 1 | 1 |
| P9 | 0 | 0 | 1 | 1 | 1 | 1 | 1 | 1 |
| P10 | 0 | 0 | 1 | 1 | 1 | 1 | 1 | 1 |
| Y1 | 1 | 0 | 1 | 1 | 1 | 1 | 1 | 0 |
| Y2 | 1 | 1 | 1 | 0 | 0 | 0 | 1 | 0 |
| Y3 | 1 | 0 | 1 | 0 | 0 | 0 | 1 | 0 |
| H1 | 0 | 1 | 0 | 0 | 1 | 1 | 0 | 1 |
| H2 | 0 | 1 | 0 | 0 | 1 | 1 | 0 | 1 |
| H3 | 0 | 1 | 0 | 0 | 1 | 1 | 0 | 1 |

FIG. 13

ELECTRONIC TRANSMISSION SYSTEM

CROSS REFERENCE TO RELATED APPLICATIONS

This application is a national phase of PCT/US2017/014152 filed Jan. 19, 2017, which claims the benefit of U.S. Provisional Application Nos. 62/280,145 filed Jan. 19, 2016, 62/280,902 filed Jan. 20, 2016, and 62/281,213, filed Jan. 21, 2016, all of which are hereby incorporated by reference in their entirety.

TECHNICAL FIELD

The present disclosure is generally related to electric machines, and, more particularly, to the control of electric machines.

BACKGROUND

A wide array of devices rely on electric machines for power. Of particular note, electric powered transportation and hybrid electric machines are currently becoming more common as viable alternatives to fossil fuel powered vehicles. As electric powered vehicles grow in popularity, there is a need to further enhance electric converters and inverters, and of motor/generator output conversion efficiencies to provide for the vehicle's wide range of speed and torque requirements.

For instance, standard vehicle energy storage systems and motor/generator drive systems are of fixed architecture as to the electrical circuitries which designs are incapable of operating adaptively alone, or synergistically together in order to attain higher efficiencies across the broad spectrum of the vehicles operating speeds.

SUMMARY OF THE INVENTION

In one embodiment, systems and methods of controlling switch modules for dynamically deriving selective circuitries within a plurality of similar voltage energy storage devices of an energy storage system, and/or, within a plurality of stators of a motor/generator, or a plurality of stators of system of motors/generators, thereby optimizing the utilization of energy stored, consumed, and regenerated in the operation of a vehicle.

These and other aspects of the invention may be apparent from and elucidated with reference to the embodiment(s) described hereinafter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a diagram that illustrates a table illustrating an example operation of a selectively configurable switching module according to an embodiment of an ET system.

FIG. 5 is a diagram that shows an example table that illustrates an example operation of the switch modules of an embodiment of an ET system for a selectively configurable six stator machine.

FIG. 7 is a diagram that illustrates an example table that illustrates an example operation of the switch modules of an embodiment of an ET system for a selectively configurable six stator machine.

FIG. 8 is a diagram that illustrates a comparison of the relative bEMF for each states of the ET system of FIG. 7.

FIG. 13 is a diagram that illustrates an example Look Up table for a processor to determine the technical transformation of the state of conductance of the individual bi-directional switches to derive a designated configuration of an embodiment of an ET system.

DESCRIPTION OF EXAMPLE EMBODIMENTS

Figure 1:
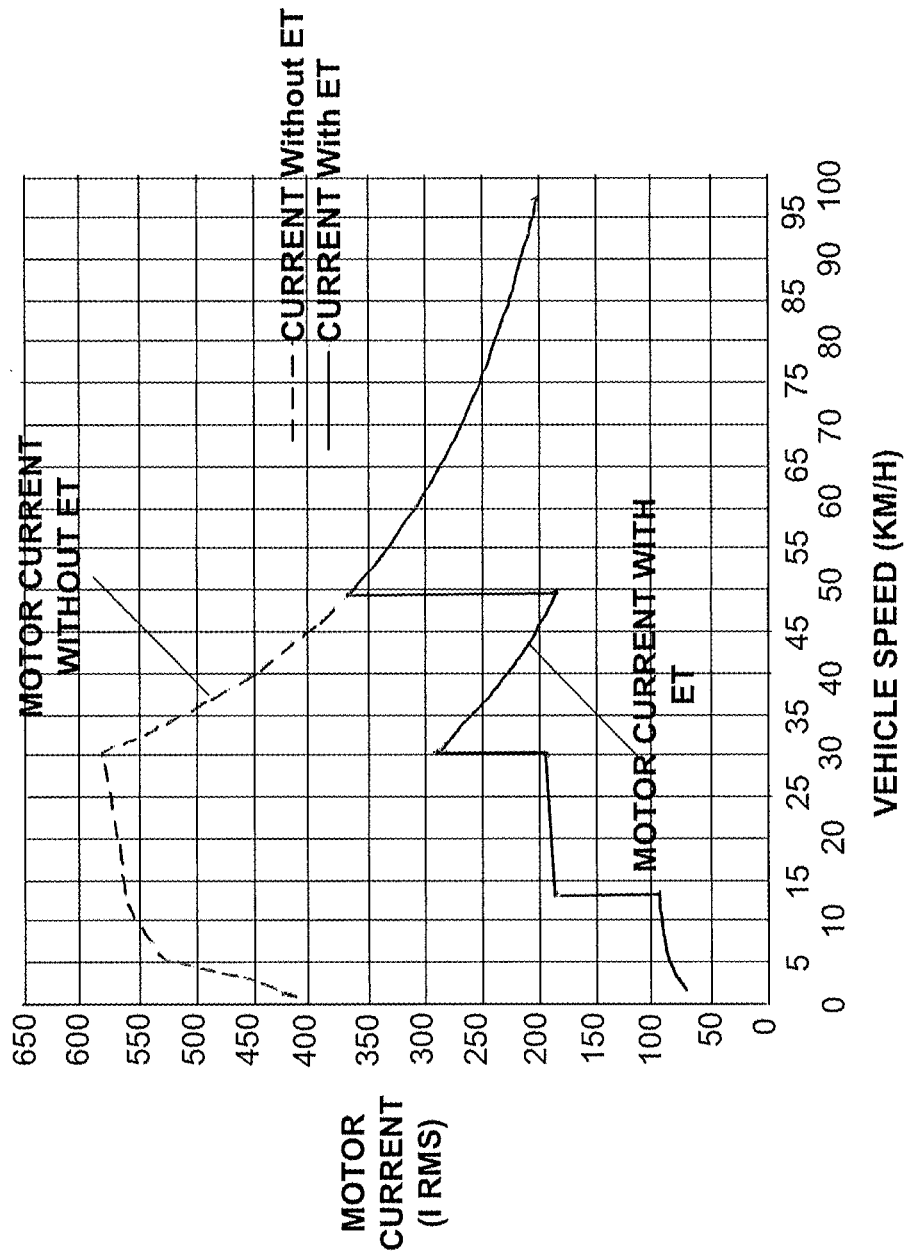
FIG. 1 is a graph diagram that illustrates an example modeling of performance of a stator machine with and without dynamic reconfiguration of an electronic transmission (ET) system.

Certain embodiments of an electronic transmission (ET) system and method (collectively, ET system(s)) are disclosed that are directed to electric machines (e.g., motors, generators) and, more particularly towards systems and methods of controlling switch modules for dynamically deriving selective circuitries within a plurality of similar voltage energy storage devices of an energy storage system, and/or, within a plurality of stators of a motor/generator (also, referred to herein as a device, which may be a motor or a generator), or a plurality of stators of system of motors/generators, thereby optimizing the utilization of energy stored, consumed, and regenerated in the operation of a vehicle. In one embodiment, an ET system is disclosed that addresses inefficiencies in conventional electric vehicle systems. For instance, in conventional electric vehicles, a significant loss of energy results from the underutilization by the motor controller/inverter of the energy stored in a battery or ultracapacitor module. The controller/converter/inverter utilization efficiency can be substantially improved if the voltage in the battery or ultracapacitor modules can be controllably dynamically adjusted in conjunction with the motor back electromotive force (BEMF) voltage and torque per ampere throughout the various states of operation of the electric vehicle. The ability to controllably and dynamically adjust the output voltage of the energy storage modules, in conjunction with controllably and dynamically adjusting the BEMF voltage of the motor/generator allows a much higher efficiency of the controller/converter/inverter due to the resulting increase in utilization, or duty, cycle of the controller/converter/inverter as the vehicle accelerates from zero speed where the BEMF of the motor is zero, up to a speed where BEMF equals the AC voltage equivalent of the DC voltage output of the bank of energy storage modules, wherein both, the energy storage module voltage and the BEMF motor/generator voltage are adjustable so that the lowest voltage output from the energy storage module and the highest BEMF and torque per ampere is available at the lowest vehicle speeds and each are controllably and dynamically adjustable as vehicle speed increases or decreases. In addition to the increased efficiency resulting from increasing the utilization cycle, and the rate of utilization cycle during acceleration, the increase in torque per ampere allows a substantial decrease in amperes required throughout the electrical system, thereby thermally destressing the energy storage modules, the controller/converter/inverter, and the motor(s)/generator(s). Accordingly, certain embodiments of an ET system address the entire electrical system in the vehicle, from energy storage to energy consumption to energy regeneration. The ETS achieves the highest potential efficiency of propulsion during acceleration and cruise and the highest potential efficiency of regeneration during deceleration, coasting, or braking.

Further, standard vehicle energy storage systems and motor/generator drive systems are of fixed architecture as to the electrical circuitries which designs are incapable of operating adaptively alone, or synergistically together in order to attain higher efficiencies across the broad spectrum of the vehicles operating speeds. In contrast, certain embodiments of an ET system enables dynamic and select technical transformations of the electrical energy storage systems and/or, select technical transformations of the motor(s)/generators, which twin transformability avails enhanced matching between the requirements and capabilities of the energy storage system and the motor(s)/generators across the requirements of the vehicle's torque and speed ranges. Therefore, the electronic transmission system derives enhanced system operating efficiencies across a broader spectrum of the vehicle's operating speeds.

Electric motor or generator systems output falls into a defined efficiency range. Greater efficiency is achieved when the power electronics and an electric motor or generator is operating at base speed. Operating outside the base speed is less than optimal. That is, under various operating conditions, output torque from the electric motor may be outside a desired operating envelope, or the output voltage of a generator may be outside a desired operating envelope, or an electrical energy storage system's voltage may be outside the desired operating envelope of the voltage output derived during the regenerative braking operation of a generator, or the electrical energy storage system's voltage may be outside the desired operating envelope of the voltage to be input to an inverter to power a motor. One area of current exploration to improve electric motor/generator and electrical energy storage performance is enhanced topologies of dynamic circuitries and of switch control. Adjustable speed motor control inverters are currently used to power traction motors employed in certain electric and hybrid electric vehicles.

In some embodiments, an additional improvement is to provide for a means to adjust torque and speed attributes of a motor and to enhance regenerative braking power generation, conversion and storage via the utilization of an embodiment of an ET system, which dynamically and selectively channels the direction of electron flow, into series and/or parallel circuitries, through a plurality of selectively configurable stators to increase the operational efficiency of the entire power system.

By dynamically reconfiguring via the utilization of a plurality of switches, the route of current that passes through the plurality of stators one can dramatically reduce the amount of current that needs to be converted and inverted so as to derive a specific force (e.g., torque), as is exhibited in the graph shown in FIG. 1, which models the performance of a six stator machine which is dynamically reconfigurable into six stators in series, or two parallel subsets of three stators in series, or three parallel subsets of two stators in series, or all six stators in series (with this example circuitry of a 3 phase, wye arrangement of phases). Each of the example four configurations may be referred to as a gear of the electronic transmission. The dashed line represents for a given voltage supplied by a power source and a given rated torque output of a six stator, 3 phase, Wye connected machine that is fixed in a six stator in parallel configuration, and the solid line represents the same six stators being reconfigured dynamically in stepped fashion progressively as higher angular velocities are attained into the four "gears" described above. By comparison, the system (e.g., an ET system) that utilizes the ability to dynamically reconfigure its stator circuitry requires dramatically less current to be converted and inverted than does a system that has a fixed architecture of an all in parallel stator circuitry. Such reduction in current that has to be converted and inverted provides for far higher power conversion efficiency of the total system.

Figure 2:
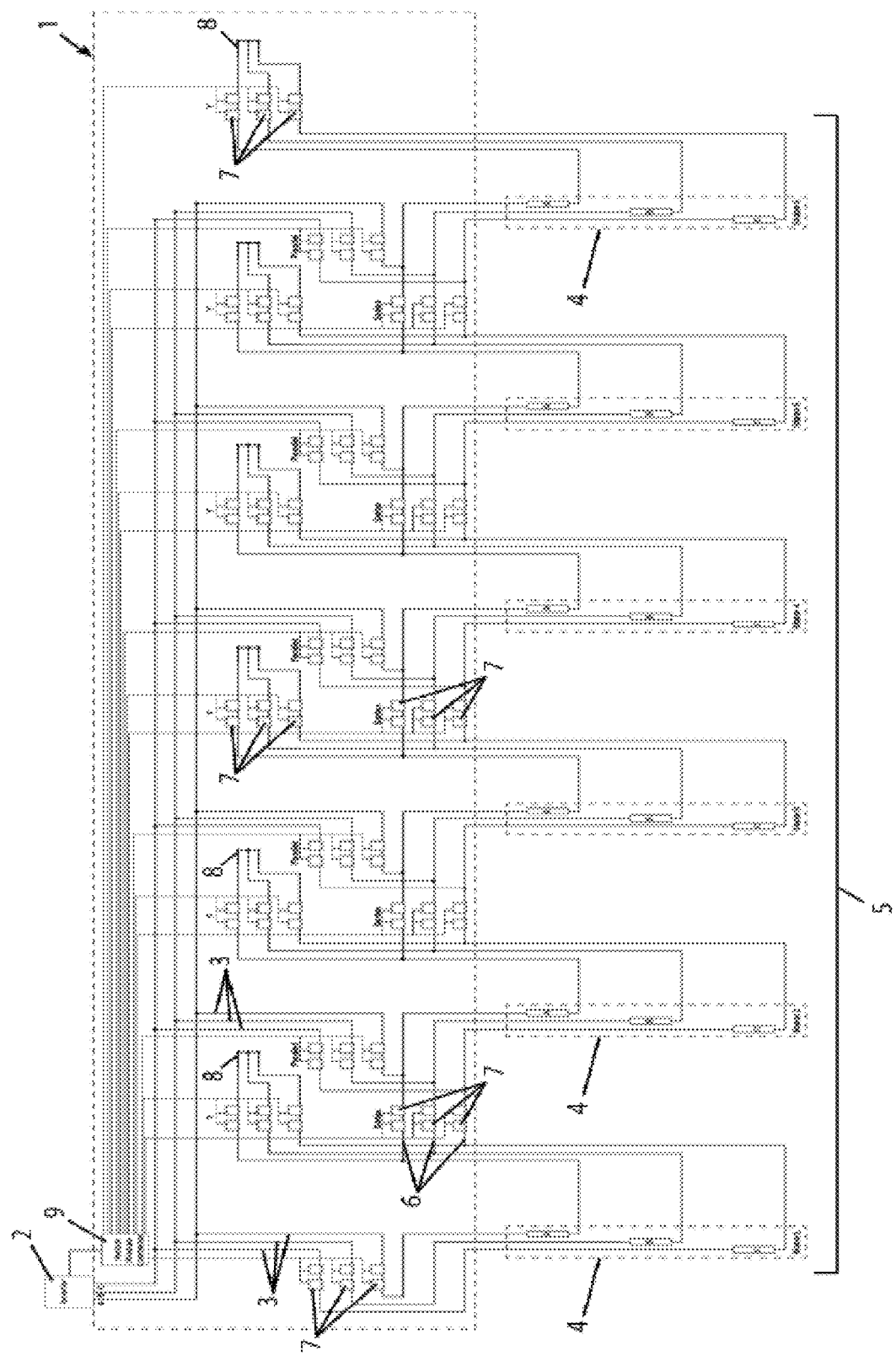
FIG. 2 is a schematic diagram that illustrates an example topology of a portion of an embodiment of an ET system.

Referring now to FIG. 2, which illustrates one embodiment of a topology of a portion of an ET system, this embodiment providing selectively for a discrete Wye or H bridge control of each stator and for parallel and/or series connectivity for each of the plurality of the stators. In one embodiment, a module 1 is shown, which comprises conductors equal in number to the number of phases, which conductors are in electrical communication to an inverter 2 and to each of the phase leads 3 of a first stator 4 of a multi-stator selectively reconfigurable permanent magnet machine 5. The conductors 3 are linked by branch conductors 6 to switch modules 7 which switch modules provide for bidirectional control as they are capable in their closed state to provide for bidirectional current flow and in their open state to provide for bidirectional blocking of current flow, such plurality of switch modules is equal to the product of the number of phases times the number of stators, i.e., P*S, whereby P equals the number of phases and whereby S equals the number of selectively reconfigurable stators of a selectively reconfigurable motor/generator machine and whereby S is an even number greater than zero. These conductors and switch modules selectively provide for establishing parallel power flow to and through the individual stators, or in the alternative, to establish parallel subsets of selectively reconfigurable stators with such subsets being of a like quantity of stators linked in series.

Additionally, there are conductors 6 and bidirectional switch modules 7, which number of bidirectional switch modules is equal to the product of the number of phases times the remainder of the number of selectively reconfigurable stators minus one, i.e., P*[S−1] whereby again, P equals the number of phases and S equals the number of selectively reconfigurable stators of a selectively reconfigurable permanent magnet machine and whereby S is an even number greater than zero, which bidirectional switch modules individually and separately link one power lead 3 from one end of each phase winding of a stator 4 to a power lead to the opposite polarity lead of a like phase winding of another stator 4 (e.g., A1− to A2+) so as to selectively allow for linking the stators all in series or in the alternative as subsets of like quantity of stators linked in series.

Also there are bidirectional switch modules 7 equal to the product of the number of phases times the number of selectively reconfigurable stators, P*S, whereby yet again, P equals the number of phases and S equals the number of selectively reconfigurable stators within the selectively reconfigurable permanent magnet machine 5 and whereby S is an even number greater than zero, which bidirectional switch modules link from a phase power lead of a selectively reconfigurable stator to a Wye junction 8 that provides for electrical communication of each of the phases of the said selectively reconfigurable stator configuration.

And, there is switch module controller 9 which switch module controller is in communication (e.g. by conductors or by radio or optical linkage) with the bidirectional switch modules 7 so as to selectively open or close a circuit leading to and from each bidirectional switch module.

Said selectively reconfigurable multi-stator permanent magnet machine and switch module configuration retain equal or nearly equal impedance across each stator circuit and each phase so as to maintain near balance of current through each: 1) phase, and/or, 2) each stator when such selectively reconfigurable stators are linked all in parallel, or all in series, or are linked in subsets of stators linked in series wherein such series linked subsets of stators have like quantity of stators linked in parallel.

Note that an alternative circuit scheme may provide for similar quantities of parallel linked subset of stators which stators do not need to be adjacent to each other, for example, stators designated one, three and five may be linked in parallel which subset is linked in series to a second subset of stators designated as two, four and six, such that there are two subsets of stators linked in series which subset each has three stators linked in parallel, and likewise for having three subsets of stators linked in series whereby each subset has two stators linked in parallel. Physical adjacency not being a determinate factor as to maintaining symmetry of torque and of impedance balancing of the subsets linked in series, but adjacency of linkage of the stators can simplifies the actual connectivity for any electronic transmission system.

Table 1, illustrated in FIG. 3, illustrates an example operation of a selectively configurable switching module for a six (6) stator machine and four symmetric and impedance balanced configuration states of the stators (for a Wye configuration). Table 1 provides guidance as to the operation of the switches of the above example electronic transmission so as to derive the selected technical transformation and configuration of the machine.

Figure 4:
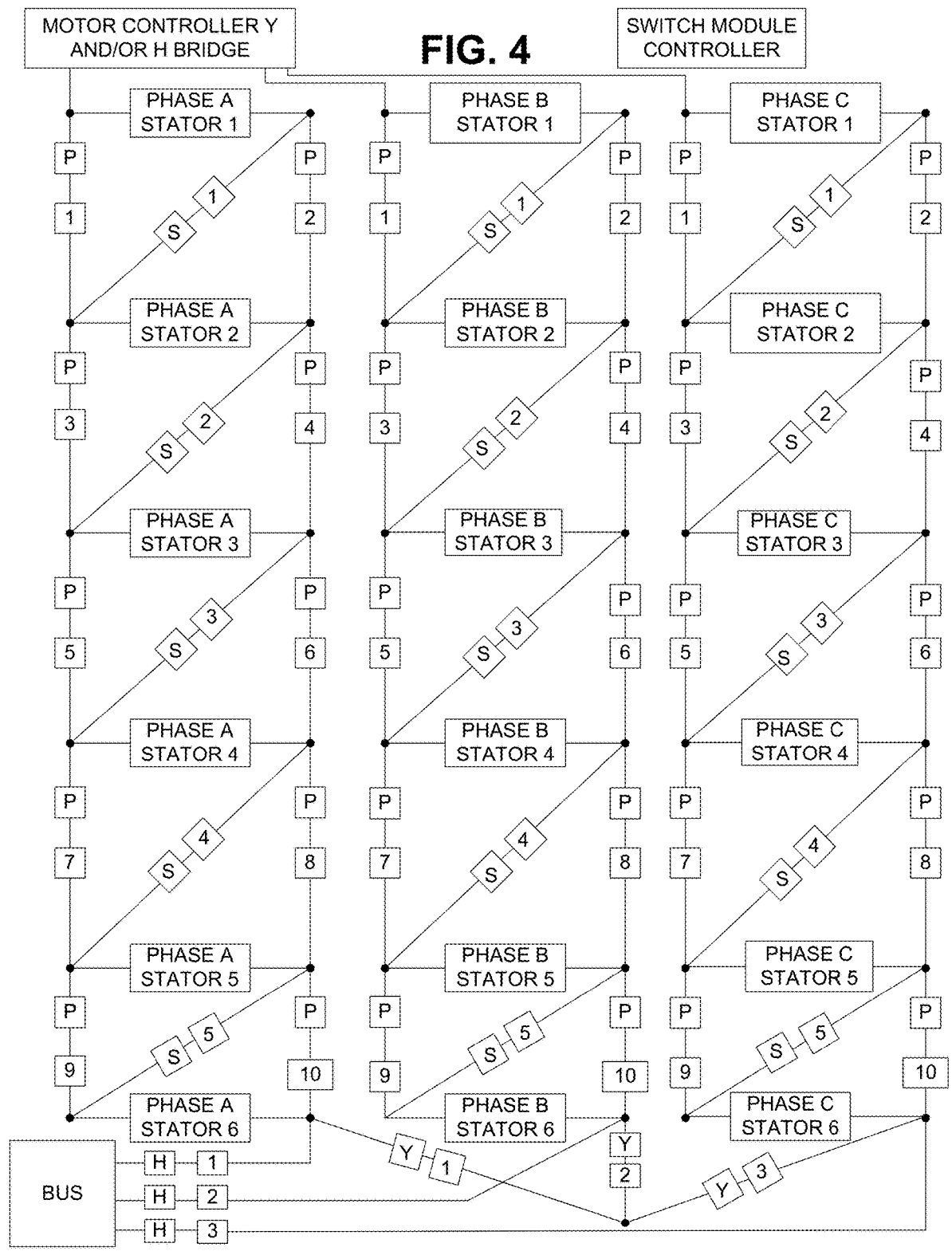
FIG. 4 is a schematic diagram that illustrates an embodiment of an ET system for a 3 phase, six stator motor for a Wye or an H Bridge configuration.
Figure 6:
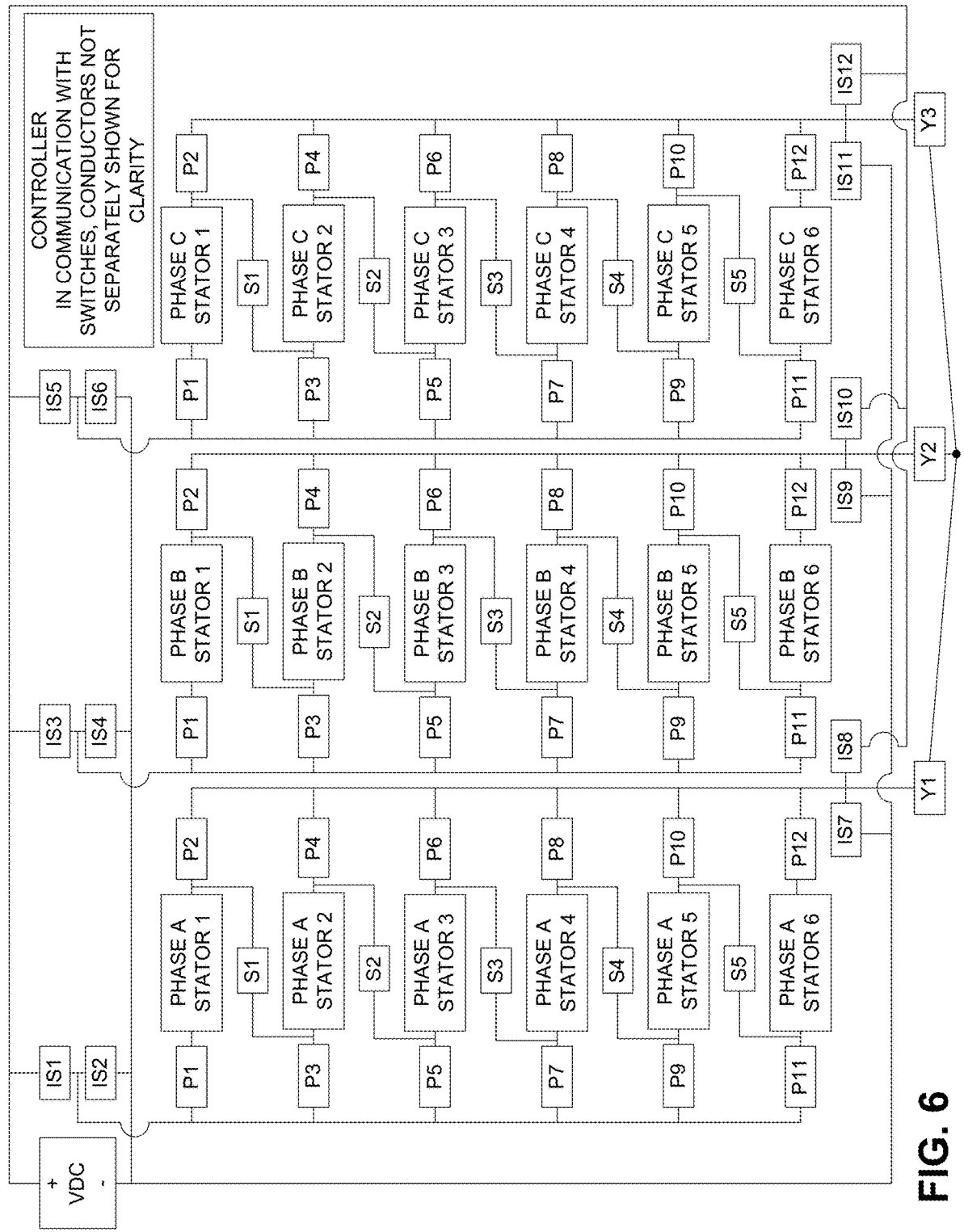
FIG. 6 is a schematic diagram that illustrates an example topology of a portion of an embodiment of an ET system.

A second example embodiment of a ET system (i.e., of the stator circuitry portion) is illustrated by the topology depicted in FIG. 4, albeit this being specifically for selectively symmetrically reconfiguring stators in series and/or parallel arrangement within a Wye or an H bridge configuration of a three phase, impedance balanced, six stator machine. The ET system of FIG. 4 comprises an illustration of an ET system for a 3 phase, six stator motor for a Wye or an H Bridge configuration. That is, this example embodiment providing for a common Wye for phase terminal connectivity all of the plurality of the stators, instead of selectively providing for a discrete Wye phase terminal connectivity for each of the plurality of the stators as is depicted in FIG. 2. This second example embodiment of an electronic transmission system not necessarily being a preferred embodiment as it causes current to flow in series connectivity through the plurality of parallel connecting switches which can increase conductance losses and require the use of higher amperage ratings of bidirectional switch modules than may be required if a common bus was utilized for providing power to each of the parallel circuit forming switches which preferred topology is depicted in the example embodiment as illustrated in FIG. 6. Such second example embodiment of an ET system, or portion of an ET system, comprises of: a motor or generator controller which provides power via a conductors equal in number to the number of electrical phases (and/or of split phases) utilized in the machine which conductors connect to a terminal of a stator, a switch module controller which has conductors (not illustrated separately in FIG. 4 for clarity sake) leading from the switch module controller to each individual electrically controllable switch module, and switch modules which can be selectively electrically opened or closed by a voltage and current provided from the switch module controller such that each switch module can provide for current to flow bi-directionally to and from conductor leads, or to provide for current to be blocked from flowing bi-directionally to and from conductor leads which conductor leads link to phase terminals of stators. The plurality of switch modules is equal to: $3*[P*[S-1]]$, where P equals the number of phases and/or split phases, and S equals the number of stators linked in the system, and whereby S is an even number greater than zero, of which plurality of switch modules, $2*[P*[S-1]$ are utilized for selectively providing for parallel linkage of the stators and $P*[S-1]$ are utilized for selectively providing for series linkage of the stators.

Also shown in FIG. 4 are conductors leading from each individual phase of stators to switch modules, illustratively designated Y1, Y2 and Y3, and thence to a common wye junction, the number of such conductors and switch modules equal to the number of phases (and/or split phases) utilized in the machine, such switches designated with a Y are only necessary if one desires to be able to selectively disconnect a Wye terminal and to utilize an H bridge control scheme; one of the switches designated by an Y may be deleted from the Wye terminal forming circuit and still allow for deriving an Wye circuit but the elimination of one such H designated switch may derive some impedance misbalancing of the multiphase circuits. The conductors leading from each individual phase of stators to bidirectional switch modules, which bidirectional switch modules are illustratively designated H1, H2 and H3, and thence leading back to the low side of an H bridge motor controller (e.g., 3 phases of power return by independent bus to the low side of an H bridge controller), the number of such conductors and switch modules equal to the number of phases (and/or split phases) utilized in the machine. The bidirectional switches designated with an H are only necessary if one desires to selectively disconnect an H bridge control and to utilize a Wye circuit scheme.

The term "stator" as used herein is defined to broadly include, any of, a turn or turns, a winding or windings, a coil or coils, a segment of a coil or winding, a segment of a motor's or generator's stator, complete stators, or sets of stators, or even complete motors or generators that can be electrically configured in series and/or parallel arrangement either within a phase or by reconfiguration of the current flow of a multi-phase circuitry to form either a Y (which is in effect an in-series configuration of phase circuitry) or an H bridge circuit (which is in effect a parallel configuration of phase circuitry).

Such specific example electronic transmission system for the six stator machine illustrated in FIG. 2 can be selectively arranged to provide for eight "gears", whereby a "gear" is a configuration of stators conductively linked by switch modules so as to be in series and/or parallel arrangement in either a Y or an H bridge circuit so as to derive symmetry in providing torque forces to the stators and rotor(s) so as to not cause imbalanced forces to shafts or bearings and to provide for balanced impedance so as to avoid unnecessarily derating of the power of the machine due to an imbalance in current flowing relative from stator to stator, or to relative from phase to phase.

The example embodiments herein depicted are for a six "stator" machine, but fewer or more "stators" may be utilized and still retain symmetry of reconfiguration, for example a two "stator" machine may be reconfigured from a two in series to a two in parallel circuitry, which two stators, if operated as a multi-phase machine, may be linked in either a Y or an H bridge circuitry to realize four symmetric and impedance balanced configurations.

Asymmetric configurations of the stators and phases may be realized and are not precluded by the disclosed ET system embodiments but which lack of symmetry and/or lack of impedance balancing may induce imbalanced torque which may be problematic particularly as to durability and/or may result in derating of the power of the machine (motor or generator) due to phase imbalances and/or concentrated current loading through segments of the circuitry.

Referring now to FIG. 5, shown is Table 2, which illustrates an example operation of the switch modules of an ET system for a selectively configurable six stator machine from a common Wye reconfigurable to an H Bridge circuit (once again, for four symmetric and impedance balanced configuration states of stators). Table 2 details the open or closed state of switching modules for operation of the second example electronic transmission for a selectively configurable six stator machine so as to derive eight gears or motor configurations, listed in order of speed of operation, slowest to fastest: six stators all in series with a Y circuit; six stators in series with an H circuit, 3 stators in series, parallel to, 3 stators in series with a Y circuit; 2 stators in series, parallel to, 2 stators in series, parallel to, 2 stators in series with a Y circuit; 3 stators in series, parallel to, 3 stators in series with an H circuit; 2 stators in series, parallel to, 2 stators in series, parallel to, 2 stators in series with a H circuit; six stators all in parallel with a Y circuit; and six stators all in parallel with an H circuit.

Attention is now directed to FIG. 6, which illustrates an example topology of an embodiment of an ET system which provides for dynamically and selectively reconfiguring a motor/generator selectively as to series and/or parallel stator circuitries, and also to selectively be configured from a Wye to an H-Bridge inverter circuitry. A DC voltage source with at least one positive and one negative terminal, with a conductor (or conductors) leading from the positive terminal to inverter switches (illustratively designated for this example three phase machine, as IS1, IS3, IS5) equal to the number of phases of the machine and with a negative conductor (or conductors) leading to inverter switches (illustratively designated as IS2, IS4, IS6) also equal to the number of phases of the machine. For each phase circuitry of the stators of the machine, there is a conductor that connects between the positive polarity connected inverter switch(es) and the negative polarity connected inverter switch(es). For each phase circuitry, there is a conductor which performs as a common bus for powering parallel circuitries of the configurations of the stators, which conductor is connected to the conductor that connects the positive polarity connected inverter switches to the negative polarity inverter switches. From each such common phase and bus conductor(s) there is connected a selectively controllable bidirectional switch module (denoted as P1) to each of the positive terminals of each of the stators of the machine, said bidirectional switch module being be selectively controlled to be either AC current conducting, or AC current blocking. For each phase circuitry of each stator, there is connected to the negative terminal of each of the stators another selectively controllable bidirectional switch module (illustratively designated as P2 through P12) which bidirectional switch modules are in turn connected to a conductor which performs as a common phase bus for powering parallel circuitries of the configurations of the stators. For each phase circuitry of each stator (except for the stator that is the last of the longest configurable in series connected circuitry of the stators) there is also connected to the negative terminal of each of the stators another selectively controllable bidirectional switch module (illustratively designated as S1 through S5), which bidirectional switch module(es) is (are) connected to a conductor that connects to the positive terminal of another stator so as to selectively form a series connection of each phase of the stators.

In the embodiment depicted in FIG. 6, the plurality of bidirectional switch modules is equal to: [3P*[S−1]]+2P, where P equals the number of phases and/or split phases, and S equals the number of stators linked in the system, and whereby S is an even number greater than zero, of which plurality of bidirectional switch modules, [2P*[S−1]+2P are utilized for selectively providing for parallel linkage of the stators and P*[S−1] are utilized for selectively providing for series linkage of the stators. Albeit, for the circuit connection of the stator that can be configured to be the first in a series circuitry of all of the stators of the machine (denoted as Stator 1), the inclusion of a positive conducting bidirectional switch module (illustratively designated as P1) is optional, but the inclusion of such bidirectional switch module (P1) may be enabling towards enhancing the impedance balancing between the stator phase circuitry which is inclusive of such first stator (illustratively designated as Stator 1) and other stator circuitries when a parallel circuitry of the stators is selectively configured.

Therefore, there are alternative embodiments wherein the plurality of bidirectional switch modules is equal to, either: (a) [3P*[S−1]]+P, where P equals the number of phases and/or split phases, and S equals the number of stators linked in the system, and whereby S is an even number greater than zero, of which plurality of bidirectional switch modules, [2P*[S−1]]+P are utilized for selectively providing for parallel linkage of the stators and P*[S−1] are utilized for selectively providing for series linkage of the stators, or (b) [3P*[S−1]], where P equals the number of phases and/or split phases, and S equals the number of stators linked in the system, and whereby S is an even number greater than zero, of which plurality of bidirectional switch modules, [2P*[S−1]] are utilized for selectively providing for parallel linkage of the stators and P*[S−1] are utilized for selectively providing for series linkage of the stators.

Optionally, if an H-Bridge drive system is desired to be enabled, for each phase circuitry of the stators, there are a high and a low inverter switch for selectively forming and controlling an H-Bridge control, which low side switches are illustratively designated as IS7, IS9, and IS11 and which high side switches are illustratively designated as IS8, IS10 and IS12. One terminal of the low side forming switches connect to a conductor that leads to the negative polarity terminal of the DC power source. One terminal of the high side forming switches connect to a conductor that leads to the positive polarity terminal of the DC power source. The remaining terminal of the H-Bridge control forming switches (illustratively designated as IS7 through IS12) are connected to the common bus conductor that leads to the bidirectional switch modules that form parallel circuitry connections of the stators (such bidirectional switch modules illustratively designated as P2, P4, P6, P8, P10, P12).

Optionally, if an H-Bridge drive system is desired to be enabled, for each phase circuitry of the stators, there is a selectively controllable bidirectional switch modules (illustratively designated as Y1, Y2 and Y3 for a three phase machine) which are closed for selectively forming a Y junction connection of the phases, or are open to selectively disconnect a Y junction connection of the phases. An alternative embodiment may require a quantity of bidirectional switch modules equal to one less than the number of phases, whereby one of the phases may be hard connected to a Y forming junction of the phases. This embodiment with one less bidirectional switch module may not provide for a fully impedance balanced circuit due to the lack of the impedance of a bidirectional switch module of the flow or current through the phase circuitry that is not inclusive of a bidirectional switch module.

Alternative inverter topologies may be used to power the stators circuitries which stators are dynamically reconfigurable into series and/or parallel circuitries. The number and/or types of the inverter and of the bidirectional switches may be more than one, for example, such switches may be paralleled to provide for added current capacities and/or to reduce conductance losses by sharing the current load.

More than one bidirectional switch module can be linked in parallel circuitry so as to provide for greater current carrying capacities or to reduce conductance losses which paralleled switching may then need to be controlled to work simultaneously with each other. For simplicity and clarity of illustration of each of the circuit topologies only one bidirectional switch module is shown in the circuitries.

The term "stator" as used herein is defined to broadly include, any of, a turn or turns, a winding or windings, a coil or coils, a segment of a coil or winding, a segment of a motor's or generator's stator, complete stators, or sets of stators, or even complete motors or generators that can be electrically configured in series and/or parallel arrangement either within a phase or by reconfiguration of the current flow of a multi-phase circuitry to form either a Y junction (which is in effect an in-series configuration of phase circuitry) or an H bridge circuit (which is in effect a parallel configuration of phase circuitry).

Referring now to FIG. 7, shown is Table 3, which illustrates an example operation of the switch modules of an ET system for a selectively configurable six stator machine from a common Wye reconfigurable to an H bridge circuit (for four symmetric and impedance balanced configuration states of stators), and which details the open or closed state of switching modules for operation of the second example electronic transmission for a selectively configurable six stator machine so as to derive eight "gears" or motor configurations, listed in order of speed of operation, slowest to fastest: six stators all in series with a Y circuit; six stators in series with an H-Bridge circuit; 3 stators in series, parallel to, 3 stators in series with a Y circuit; 2 stators in series, parallel to, 2 stators in series, parallel to, 2 stators in series with a Y circuit; 3 stators in series, parallel to, 3 stators in series with an H-Bridge circuit; 2 stators in series, parallel to, 2 stators in series, parallel to, 2 stators in series with a H-Bridge circuit; six stators all in parallel with a Y circuit; and six stators all in parallel with an H-Bridge circuit.

FIG. 8 is a table that illustrates a comparison of the relative bEMF for each states of the immediate above example ET system. In comparison to a permanent magnet motor of fixed stator circuitry configuration a reconfigurable motor can utilize far less inverted current. By way of example, at a low speed range of operation, such as at start up, comparing the example motor with the electronic transmission above, the converter/inverter only needs to provide $\frac{1}{10}^{th}$ the amount of current to the motor to achieve the same torque when the motor is in a six stators in series with a Y configuration then may be required to have inverted current, if the motor was configured in a six stators in parallel with an H circuit configuration. That means that the current is reduced nine (9)-fold in the converter/inverter, which provides for very significant enhancement of system efficiency and reduction of conduction losses in the inverter and a corresponding reduction in converter/inverter cooling requirements.

The efficiency of the power conversion of the voltage converter and/or inverter component of the system is highly dependent on the voltage differential between the voltage provided by the power source to the converter and/or inverter and thence the voltage required to be provided through the plurality of switches that establish the direction of current that is thence passed through the plurality of stators of the motor. For DC power sources that have voltages that vary (e.g., depending on the State of Charge, rate of current draw, temperature, capacity, state of newness or degradation of the energy storage device, such as is the case with the likes of batteries, capacitors and/or fuel cells), the calculation function of a method of operating an electronic transmission system should take into account the state of the variable voltage that is provided to power the system as an input value in determining the optimized dynamic reconfiguration of switches to establish a route of current through the plurality of stators of the motor such as to achieve the highest torque per ampere drawn from a DC power source. The bEMF and the resistance of the plurality of stators and of the plurality of switches utilized changes depending on which configuration of stator circuitry is selected and implemented by the dynamic reconfiguration of the state of the switches to establish a route of current through the plurality of stator of the motor such as to achieve the highest torque per ampere drawn from a DC power source; as the bEMF and/or the resistance of the system increases the duty cycle of the converter/inverter component of the system may increase and derive enhanced efficiency from comparatively lower switching losses due to improved voltage matching, Vin to Vout; hence the value inputs to the calculation function should include the angular velocity which may be multiplied by the voltage constant of the specific configuration of stators to determine the bEMF which bEMF is an offset to from the voltage of the power source to determine the net voltage available to the system; or alternatively one may measure the voltage directly of line or phase voltage and use such as input values for the calculation function for dynamically configuring a calculation function that optimizes a dynamic reconfiguration of switches to establish a direction of current through the plurality of stators of the motor such as to achieve the highest torque per ampere drawn from a DC power source.

Angular velocity, or an equivalent reference metric can be derived by direct measure of the motor's rotor, by indirect measures involving e.g., bEMF, or line to line, or phase voltage, or by a measure of the velocity of the output power train such as the axle speed or wheel speed of a vehicle.

Additionally, when the motor is "shifted" by the ET system into the longer length of conductor stator circuitries, i.e, the lower gears, the resistance of the circuit increases additively with each component that is placed in series versus in parallel circuitry and the bEMF of the motor also increases. By way of example, assuming a fixed or nearly fixed high voltage source, or a voltage source that declines during usage, as occurs when a battery's state of charge declines or when a high rate of current is drawn from a battery, which is commonly the situation derived from a high voltage battery pack of an electric vehicle, the higher resistance and bEMF, collectively together allows for a significantly higher modulation of the converter's switches and improved conversion/inversion efficiencies especially when operating at low load and a low speed, than may be the case if the motor was fixed in its configuration to the highest gear, e.g, the all in parallel with an H circuitry. This efficiency gain opportunity is a result of effectively narrowing the difference between the higher fixed source voltage and the required output voltage so as to allow the converter to modulate in an efficient mode.

The reconfiguring of the motor(s)/generator(s) machine by the electronic transmission system is also of benefit when operating the machine as a variable speed and variable torque generator, e.g., as a regenerative braking device on a vehicle or as generator on a variable power turbine, e.g., wind or a solar thermal powered turbine. Such a machine operating as a generator may reconfigure so as to derive a voltage that is closer to a desired output voltage so as to narrow the difference of voltages for power conversion and thus provide opportunity for enhanced efficiency of total power conversion.

These efficiency gains should be considerably realized when a motor has to operate at the lower speed ranges, and at low loads across all speeds, but may be also comparatively beneficial at the applicable optimal speed range for reconfiguration to each of the lower gears, while operating at the lower end of the range of speed of each such lower gear.

Beside the causes of variant voltage available from an energy storage system mentioned previously (e.g., depending on the State of Charge, rate of current draw, temperature, capacity, state of newness or degradation of the energy storage devices) an embodiment of an ET system includes an energy storage system that comprises a plurality of similar voltage energy storage devices and a plurality of bidirectional switch modules that provide for dynamically and selectively connecting the plurality of energy storage devices into series and/or parallel circuitries so as to dynamically and selectively derive different DC voltages across the output terminals of the energy storage system. The plurality of electrical energy storage devices may comprise of battery cells, and/or capacitors, and/or fuel cells.

Figure 9A:
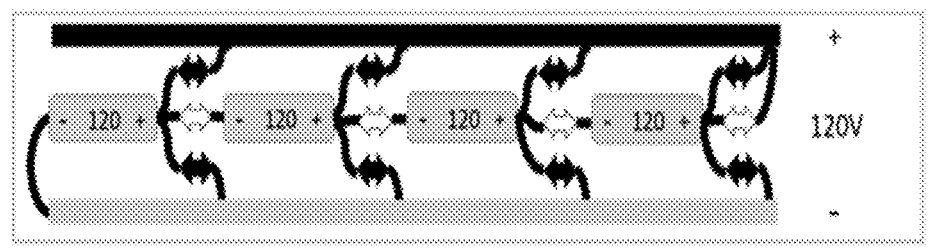
FIGS. 9A-9C are schematic diagrams that illustrate example electrical energy storage system with a plurality of bidirectional switch modules and a plurality of similar voltage energy storage devices according to an embodiment of an ET system.
Figure 9B:
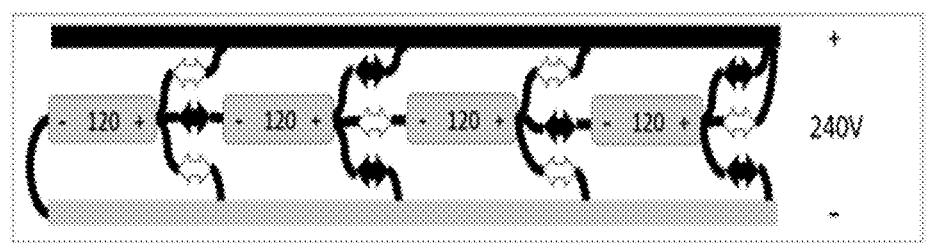
Figure 9C:
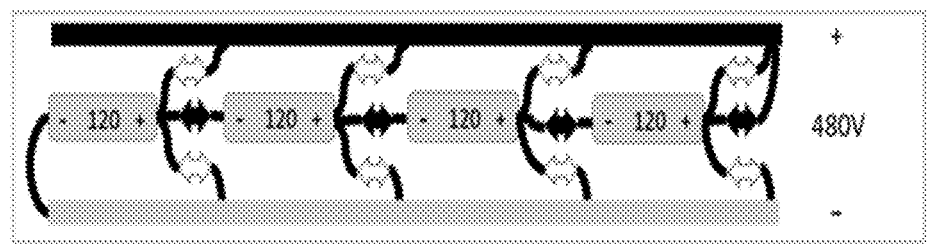

The following three illustrations depicted in FIGS. 9A-9C are of an example electrical energy storage system with a plurality of bidirectional switch modules and a plurality of similar voltage energy storage devices, this example being of a system comprising of four electrical energy storage devices, each of 120 volt, which can be dynamically and selectively configured to be linked all in parallel thereby deriving 120 volts, or two in series parallel to two in series thereby deriving 240 volts, or all in series to derive 480 volts. In FIG. 9A, the middle switches (icons for off and on switches as shown) are all off, and the top and bottom switches are on. From left to right in FIG. 9B, the first set of switches is (from top to middle to bottom) off, on, and off. For the second set, from top to middle to bottom is on, off, on. And for the third set, the top, middle, bottom switch is off, on, off. Referring to FIG. 9C, the sets (from left to right, and top, middle, to bottom) are off, on, off, followed b off, on, off, followed by off, on, off.

One embodiment of an ET system comprises both the dynamically and selective reconfigurable energy storage system and a dynamically and selectively reconfigurable stator circuitry of a motor/generator (or a system of motor (s)/generator(s)). Such an embodiment of an ET system thereby provides for the potential realization of a novel and highly efficient regenerative braking scenario whereby the motor(s)/generator(s) are configured so as to be able to realize a safe operating rectified output voltage that is greater than the selectively configured voltage of the energy storage module. For a moderate range of generated voltages, a higher rectified voltage can be directly utilized to charge the lower voltage energy storage module without need for DC to DC power conversion. If needed to regulate current inrush to the energy storage system, the higher rectified voltage can be bucked down by a DC to DC converter until the rectified voltage decreases to a safe DC voltage value that permits direct charging to the energy storage system which decreasing rectified voltage may arise naturally as the generator slows due to the regenerative braking upon. Whereas typical regenerative charging systems of vehicles are restricted to boosting of a lower rectified output voltage in order to charge a higher voltage energy storage system. Enhanced efficiency of power storage can be realized from regenerative braking by selectively utilizing a buck power converter, and/or of a boost power converter, or of a buck/boost converter so as to work in concert with selectively derived DC charging voltages arising from a reconfigurable energy storage system along with selectively reconfiguring the stator circuitries to efficiently manage the difference between the generated voltages and the energy storage system's voltages. One embodiment of an ET system can be programmed to determine at an instantaneous angular velocity whether it is more efficient to: One, utilize a higher, yet safe operating level of rectified voltage for charging directly a lower DC voltage configuration of the energy storage system; or as a second alternative to buck a higher, yet safe operating level of rectified voltage before charging a selected DC voltage configuration of the energy storage system; or third to boost a lower generated and rectified voltage before charging a selected DC voltage configuration of the energy storage system.

Figure 10:
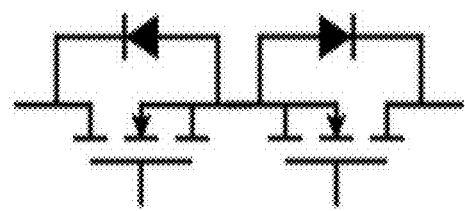
FIGS. 10-12 are schematic diagrams that illustrate example switches for certain embodiments of an ET system.
Figure 11:
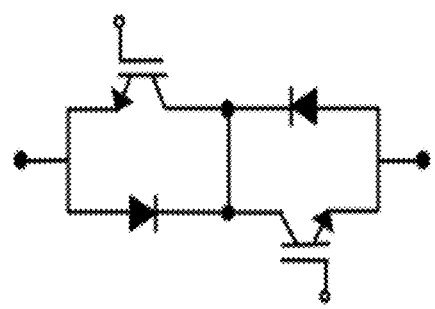
Figure 12:
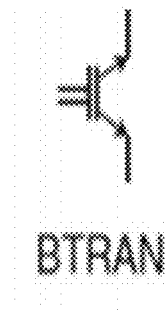

An ideal switch may be used for realizing an ET system, but less than ideal switches that have good efficiencies as to conduction and switching losses and which can be controllably shifted nearly instantly on the fly during operation of the motor/generator, are readily available and are continually being enhanced; examples of power electronic components that can be used to provide bi-directional current flow when the switch is closed and to provide bidirectional current blocking when the switch is open include, but are not limited to MOSFETs (FIG. 10) (e.g., to derive a bi-directional switch module, two MOSFETs are required in an anti-series configuration so as to block voltages in both directions while allowing for bidirectional current flow, with one such arrangement depicted in FIG. 10), IGBTs (FIG. 11), or the more recently developed BTRAN (Bidirectional Transistor) depicted in FIG. 12.

The BTRAN is likely to be a preferred bidirectional switch for configuring a bidirectional switch circuitry for novel fabrication and utilization of an ET system in order to derive the technical transformation of the circuitry through a plurality of stators, and/or, the technical transformation of the circuitry through a plurality of energy storage devices of an electrical energy storage system. The BTRAN requires only one component instead of the multiple components of an anti-series connection of MOSFETs or IGBTs, in order to derive a bidirectional switch functionality and the BTRANs has comparatively very low conductance losses. The bidirectional switches used in certain embodiments of an ET system, while themselves not being used for high frequency switching except during the brief moment when they are changing "gears" (that is to say, during the reconfiguration of the stator or phase circuitry or of the energy storage system circuitry), can be subject to high voltage transients due to the counter electromagnetic force potential of the induction in the motor/generator.

Power transistors, e.g., IGBTs but especially MOSFET's and BTRANs inherently enable extremely fast switching speeds. As a result, designers often use them in high speed switching circuits which take advantage of this capability. Using high speed switching circuits can lead to adverse device stress not normally encountered in slower switching circuits. In fact, switching speeds may be so fast that at device turn-off, small parasitic inductance in the circuit can lead to significant over voltage transients and inductances in a motor can be magnitudes of order larger than the parasitic inductances. This is due to the fact that when current through an inductor is abruptly turned off, the inductors magnetic field may induce a counter electromagnetic force (EMF) resisting the change. If the resulting voltage transient is large enough, a MOSFET may be forced into drain-to source avalanche, V(BR)DSS.

For a drain-to-source over voltage transient during turn-off, the peak over voltage transient during turn off can be determined by the following equation.

$$Vspk = L*di/dt + VDD \quad \text{(equation 1)}$$

where Vspk=peak over voltage transient voltage, L=load inductance, di/dt=rate of change of current at turn-off, and VDD=supply voltage. According to equation (1), the faster the switching speed and or the higher the load current the more likely a device is to experience an over voltage transient. Currents and switching speeds may be so high in some circuits that even low parasitic inductance may be enough to force devices into avalanche and possible device destruction. Additionally, it is advantageous during the operation of a vehicle if an ET system can be reconfigured quickly on the fly so as to not cause a discernable lull in propulsion or in regenerative braking which can lead to harsh backlash of the components of a drive train or noticeable change in applied force that is discomforting to passengers. Whereas a comparatively slow transition of the current flowing to the circuitry of the stators and thus a slower change in inductance may have benefit for avoiding high transient voltages. There being an inherent conflict between rapid and smooth reconfiguration by the electronic transmission system so as to mitigate a lull of the motor(s)/generator(s) and the need to mitigate high transient voltages arising during such period of reconfiguration.

Hence it can be highly advantageous to couple an ET system with a low inductance motor/generator machine(s) so as to mitigate the potential for developing damaging high voltage transients. A preferred embodiment of such a machine may be an ironless stator fabricated by multilayered printed circuit boards as depicted in U.S. Pat. No. 7,109,625 titled: Conductor Optimized Axial Field Rotary Energy Device, which permanent magnet machine's ironless stator inherent has comparatively very low inductance relative to all other permanent magnet salient and non-salient pole machines and of course induction motors and generators. Alternative embodiments of very low inductance stators may include wire wound ironless stators.

Furthermore, the value of the supply voltage (VDD in Equation 1) is highly dependent on the voltage derived by specific parallel and/or series configuration of the energy storage system. A configuration of the energy storage system that invokes a high output voltage may lead to a greater base of voltage stress to the bidirectional switches and the remainder of the electronic components that form the ET system and of the switches that compose the inverter(s)/rectifiers. A comparatively higher base voltage increases the potential that the addition of high transient voltage spikes derived from a rapid change in inductance may cause a very high Vspk (the Vspk of Equation 1) and thereby cause early onset of system component failure.

Therefore it is advantageous to be able to have an energy storage system which can be configure to operate at a lower than peak output voltage for portions of the duration of the operation of the vehicle, which simultaneously, such lower than peak output voltage of the energy storage system can also provide for enhanced torque per watt drawn from the energy storage system when the vehicle is operating in a propulsion mode or whilst such lower than peak output voltage is providing for enhanced regenerative braking efficiency as to powered generated, converted and stored to the energy storage system.

Care must be utilized when dynamically operating an ET system so as to not inappropriately derive a state of conductance of the plurality of switches that form a circuit through a plurality of stators such as to create a generator whose voltage potential at the specific angular velocity of the generator is too high and exceeds a safe operating voltage for the entirety of the electrically conductive components of the system.

There are two primary and distinct general methods of operating certain embodiments of ET systems so as to realize the technical transformation of the circuitries of the states of conductance of the plurality of switches to dynamically and selectively optimize the utilization of energy stored, consumed, and regenerated in the operation of a vehicle. The first primary method involves while the vehicle is operating, utilizing a computer processor and computer readable program code to "on the fly" actively and dynamically perform steps of a proscribed embodiment of a method so as to performing real-time calculations and comparisons in order to determine the states of conductance of the plurality of switches that may produce the enhanced efficiency of the utilization of energy stored, consumed and regenerated in the operation of a vehicle.

A second primary method is to utilize Look Up tables, whereby it is necessary to perform the same or similar proscribed methods as utilized in the "on the fly" method by either simulation modeling or by actual empirical testing at an earlier point in time other than a present "on the fly" moment. To utilize this second primary method, first simulation modeling and/or empirical testing is to be conducted across the full range of the potential reconfigurations of the parallel and/or series circuitries of the plurality of the stators and of the parallel and series configuration of the plurality of similar voltage energy storage devices that compose the energy storage system and across the range of operation of the angular velocity of the motor/generators so as to determine the set of the state of conductance of the plurality of switches of the electronic transmission system that may provide for the highest total system efficiency when operated at a specific state of voltage charge of the configurations of the electrical energy storage system and of the specific angular velocity of a motor(s)/generator(s). There is to be designated a reference (e.g., alpha or numeric) value that indicates a specific designation for each of the sets of combinations of the states of conductance of the plurality of the switches that form connectivity of the stators and of the states of conductance of the plurality of the switches that form the connectivity of the similar voltage energy storage devices of the energy storage system.

By way of examples: A number One may designate a configuration of the electronic transmission system whereby the plurality of the stators is connected into an all-in-series circuitry and when the energy storage devices are connected in all in parallel so as to have the energy storage system derive its lowest voltage configuration. A number Two may designate a configuration of the electronic transmission system whereby the plurality of the stators is connected into an all-in-series circuitry and when the energy storage devices are connected in a two in series, parallel to, two in series connection so as to derive an output voltage of the energy storage system that is twice the voltage of an all-in-series circuitry of the energy storage system. Continuing with assigning a designated reference value for each combination of stator circuitries and energy storage system configurations.

A first Look Up table is derived that has as its indexable axis values: First the angular velocity of the motor(s)/generator(s). And, secondly, the measured or calculated voltage across the terminal of one of the plurality of similar voltage energy storage devices if there is a plurality of energy storage devices in the energy storage system. At each of the cross indexes positions of the Look Up table may be placed the designated reference value of the configuration of the state electronic transmission system that derives the highest system efficiency when operating at that cross index of the angular velocity of the motor(s)/generator(s) and secondly the measured or calculated voltage across the terminal of one of the plurality of energy storage devices. If the energy storage system is not composed of a plurality of like voltage energy storage devices that can be selectively connected into parallel and/or series circuitry then the index value for the Look Up table may be the measured value of the voltage across the terminal of the energy storage system.

A second Look Up table is developed that utilizes as one index axis the designated reference value as placed in the cross index location of the first Look Up table above and on the other axis a designation for each of the individual bidirectional switch modules that are comprised in an ET system. At the cross index position of each is placed a value that designates the state of conductance for the individual bidirectional switch module, e.g, a One designating a closed and thus a conducting state of the bidirectional switch module and a Zero designating an open and thus non-conducting state of the bidirectional switch module. Table 4, illustrated in FIG. 13, is an example of such a second Look Up table, and in particular, comprises a Look Up table for a processor to determine the technical transformation of the state of conductance of the individual bi-directional switches to derive a designated configuration of an ET system. Table 4 is specific to the plurality of switches that provide the circuitry of a plurality of stators; the index axis is extended for providing for the cross-referencing of the switches that form the circuitry of a plurality of energy storage devices of an energy storage system if the energy storage system is made of selectively configurable circuitry of a plurality of energy storage devices. A switch that is closed is designated in Table 4 as a One (1) and a switch that is open is designated with a Zero (0).

This second primary method thereby providing for an embodiment of a simplified method of operation of an ET system which can be limited to determining the voltage of a state of conductance of the energy storage system and the angular velocity of the motor(s)/generator(s) and then using such determined voltage and angular velocity as indexes of the Look Up table to determine the previously determined complete set of configurations of the optimal states of conductance of the plurality of the switches of the electronic transmission system; which optimal configuration of the set of states of conductance can then be a further index to an additional Look Up table to determine the individual states of the conductance of each of the plurality of switches of the electronic transmission system that comprise such optimal configuration of the set of states of conductance of the plurality of the switches of the electronic transmission system; which data of each of the individual states of conductance of the plurality of switches can then be used by a computer processor to initiate a switch controller to implement such individual states of conductance of the plurality of switches of an ET system.

Described below is an example method of operating a control system wherein a computer processor device performs a process that dynamically optimizes a configuration of the states of switches to establish a route for current through an energy storage system and/or through a plurality of stators of a motor, and/or of a plurality of stators of a system of motors, so as to derive a technical transformation of an ET system in order to achieve an efficient torque per watt drawn from and/or an efficient conversion of watts per unit of torque charged to the energy storage system at the instant angular velocity of the motor/generator, such process comprising several stages. In a start-up stage, an example process comprises the following steps:

Step One: Receive a signal to make preparations to activate the motor and initiate this process.

Step Two: Retrieve from data stored in a non-transitory computer readable storage medium, the individual states of conductance of the plurality of the switches that control the route of current through the energy storage system for the configuration of the states of conductance of the plurality of switches that may derive the lowest DC voltage configuration of all of the dynamically controllable DC voltage configurations of the energy storage system.

Step Three: Utilize the retrieved data and a computer processor device to initiate the switch controller to implement the configuration of the individual states of conductance of the switches that control the route of current through the energy storage system so as to derive as a technical transformation the lowest DC voltage configuration of all of the dynamically controllable DC voltage configurations of the energy storage system.

Step Four: Retrieve from data stored in a non-transitory computer readable storage medium, the individual states of conductance of the plurality of the switches that control the route of inverted current through the plurality of the stators of a motor (and/or of a plurality of the stators of a system of motors) and the control program for controlling the switches required to derive the technical transformation of an inverter circuitry that may result a configuration of stator circuitry with the longest route of inverted current through the plurality of the stators.

Step Five: Utilizing the data retrieved per step four, initiate the switch controller(s) to implement the configuration of the individual states of conductance of the plurality of the switches that control the route of inverted current through the plurality of stators so as to derive as a technical transformation the configuration of the stator circuitry with the longest route of inverted current through the plurality of stators.

Step Six: Upon receiving a signal to activate the motor, initiate the inverter circuitry utilizing the retrieved control program for operating the inverter at the then instant configuration of the energy storage system and of the stator circuitry and of the inverter circuitry so as to supply the stators with voltage and current.

Proceeding with the process, after an initial acceleration stage: Step Seven: If the duty cycle of the pulse width modulation of the inverter increases and approaches 100%, or reaches 100%, retrieve from data stored in a computer readable storage medium, the individual states of conductance of the plurality of switches that control the route of current through the energy storage system for the configuration of the states of conductance of the plurality of switches that may derive the next higher DC voltage configuration of all of the dynamically controllable DC voltage configurations of the energy storage system.

Step Eight: If and when the duty cycle of the pulse width modulation of the inverter increases and approaches 100%, or reaches 100%, utilize the data retrieved in step seven and cause a computer processor device to initiate the switch controller to implement the configuration of the individual states of conductance of the switches that control the route of current through the energy storage system so as to derive as a technical transformation the next higher DC voltage configuration of all of the dynamically controllable DC voltage configurations of the energy storage system.

Step Nine: Initiate the inverter circuitry utilizing the retrieved control program for operating the inverter at the then instant configuration of the energy storage system and of the stator circuitry and of the inverter circuitry so as to supply the stators with inverted voltage and current and to produce a torque output that is similar in value to the torque output just before implementing step eight.

In a stage comprising a cruise mode of operation (with slowing or accelerating): Step Ten: Determine the voltage peak of the back electromotive force of the motor by alternatively, either: (a) Measuring the value of the peak voltage of the back electromotive force of the rotating motor or (b) retrieving from data stored on a computer readable storage medium the peak voltage constant of the back electromotive force for the current state of the route of current through the plurality of the stators; measure the angular velocity of the rotating motor; and calculate the motor's peak voltage of its back electromotive force derived as a product from multiplying the value of the peak voltage constant of the back electromotive force by the value of the angular velocity. Whence determining the angular velocity of the motor utilize like kind units of measure (e.g., revolutions per unit of time, or radians per unit of time) for both the measures used in determining the stored data of the voltage peak constant of the back electromotive force retrieved in step eleven and for the measures used in determining the angular velocity.

Step Eleven: Measure the DC voltage supplied to the inverter by the energy storage system. Calculate a quotient by using as the dividend the measured DC voltage value and as the divisor, the number of energy storage devices that compose a series circuit of energy storage devices within the measured energy storage system. If there are no series linkages of energy storage devices in the measured configuration of the energy storage system, then use a value of one for the divisor in determining the value of the quotient. For each of the dynamically controllable DC voltage configurations of the energy storage system, retrieve from data stored in a computer readable storage medium, the number of energy storage devices that compose a series circuit of energy storage devices for that specific dynamically controllable configuration of the energy storage system, which number is one or an integer greater than one.

Step Twelve: For each of the dynamically controllable DC voltage configurations of the energy storage system, calculate the potential DC voltage value as a product by multiplying the value of the retrieved number of energy storage devices that compose a series circuit of energy storage devices of that configuration of energy storage system by the quotient calculated in step eleven.

Step Thirteen: Using the data determined in step twelve of the potential DC voltage values for each of the dynamically controllable DC voltage configurations of the energy storage system, determine if there is a least potential DC voltage value that is greater than the measured or calculated peak voltage of the back electromotive force of the motor as determined in step ten.

Step Fourteen: If there is a least potential DC voltage value that is greater than the measured or calculated peak voltage constant of the back electromotive force of the motor, then determine for that least potential DC voltage value if the configuration is other than the present configuration of the energy storage system, or if the configuration is the present configuration of the energy storage system.

Step Fifteen: If that least potential DC voltage value is for a configuration other than the present configuration of the energy storage system then for that least potential DC voltage value of the configuration of the energy storage system, retrieve from data stored in a non-transient computer readable storage medium, all of the individual states of conductance of the plurality of switches that control the route of current through the energy storage system that may derive such lessened potential DC voltage configuration of the energy storage system which lessened potential DC voltage value is greater than the measured or calculated peak voltage of the back electromotive force of the motor.

Step Sixteen: Utilize the data retrieved in step fifteen and cause a computer processor device to initiate the switch controller to implement the configuration of the individual states of the conductance of the plurality of the switches that control the route of current through the energy storage system so as to derive as a technical transformation such lessened potential DC voltage configuration of all of the dynamically controllable DC voltage configurations of the energy storage system.

Step Seventeen: Initiate the inverter circuitry utilizing the retrieved control program for operating the inverter at the then instant configuration of the energy storage system and of the stator circuitry and of the inverter circuitry so as to supply the stators with inverted voltage and current and to produce a torque output that is similar in value to the torque output just before implementing step fourteen.

Step Eighteen: If during step fourteen it is determined that for such least potential DC voltage value configuration is the present configuration of the energy storage system then proceed to determine if there is a next longer configuration of the route of current through the plurality of the stators than the present configuration of the route of current through the plurality of the stators. If there is a such next longer configuration, then: (a) Retrieve from data stored on a non-transitory computer readable medium, the value of the peak voltage constant of the back electromotive force for such next longer configuration; (b) determine the angular velocity of the motor; (c) calculate the potential peak voltage of the back electromotive force of the next longer configuration of the route of inverted current through the plurality of the stators by deriving a product by multiplying the determined angular velocity of the motor times the retrieved value of the peak voltage constant of the back electromotive force for such next longer configuration' (d) utilize the data as determined in step twelve, for all of the dynamically controllable DC voltage configurations of the energy storage system, determine if there is a least potential DC voltage configuration of the energy storage system that has a potential DC voltage value that is greater than the potential peak voltage of the back electromotive force for such next longer configuration.

If there is a least potential DC voltage configuration of the energy storage system that has a potential DC voltage value that is greater than the potential peak voltage of the back electromotive force then: (a) retrieve from data stored in a computer readable storage medium, the individual states of conductance of the plurality of switches that control the route of current through the energy storage system for the configuration of the states of the plurality of switches that may derive the least potential DC voltage configuration of all of the dynamically controllable DC voltage configurations of the energy storage system that is greater than the potential peak voltage of the back electromotive force for such next longer configuration of the route of inverted current through the plurality of the stators; (b) utilize the retrieved data and a computer processor device to initiate the switch controller to implement the configuration of the individual states of conductance of the plurality of the switches that control the route of current through the energy storage system so as to derive as a technical transformation, the least potential DC voltage configuration of all of the dynamically controllable DC voltage configurations of the energy storage system that is greater than the potential peak voltage of the back electromotive force for the configuration that may result a next longer route of inverted current through the plurality of the stators; (c) retrieve from data stored in a computer readable storage medium, the individual states of conductance of the plurality of the switches that control the route of current through the plurality of stators of a motor (and/or of a plurality of stators of a system of motors) and retrieve the control program for controlling the switches required to derive the technical transformation of an inverter circuitry, that may result a configuration of stator circuitry with the next longer route of inverted current through the plurality of stators; (d) utilize the retrieved data and a computer processor device to initiate the switch controller(s) to implement the configuration of the individual states of conductance of the plurality of switches that control the route of inverted current through the plurality of stators so as to derive as a technical transformation the configuration of stator circuitry with the longer route of inverted current through the plurality of stators; (e) initiate the inverter circuitry utilizing the retrieved control program for operating the inverter at the then instant configuration of the energy storage system and of the stator circuitry and of the inverter circuitry so as to supply the stators with inverted voltage and current and to produce a torque output that is similar in value to the torque output just before implementing step above.

Step Nineteen: If the duty cycle of the pulse width modulation of the inverter increases and again approaches 100%, or reaches 100%, retrieve from data stored in a computer readable storage medium, the individual states of conductance of the plurality of the switches that control the route of current through the energy storage system for the configuration of the states of the plurality of the switches that may derive the next higher DC voltage configuration of all of the dynamically controllable DC voltage configurations of the energy storage system. If there is a next higher DC voltage configuration of all of the dynamically controllable DC voltage configuration of the energy storage system, then proceed to repeat steps seven, eight, and nine. If there is not a next higher DC voltage configuration of all of the dynamically controllable DC voltage configurations of the energy storage system then proceed to step twenty through step twenty nine.

Step Twenty: Retrieve from data stored in a non-transient computer readable storage medium, the individual states of conductance of the plurality of the switches that control the route of current through the plurality of the stators of a motor (and/or of a plurality of stators of a system of motors) and if necessary, the control program for controlling the switches required to derive the technical transformation of an inverter circuitry that may result a configuration of stator circuitry with the next shorter route of inverted current through the plurality of the stators, and also retrieve the peak voltage constant of the back electromotive force for such next shorter route of current through the plurality of the stators. Retrieve from data stored in a non-transient computer readable storage medium, or calculate a potential voltage drop factor from the energy storage system that may be derived from an increase in the amperage drawn if the configuration of the stator circuitry is changed to the next shorter route of inverted current through the plurality of the stators while maintaining an amount of torque output derived by the next shorter route of inverted current through the plurality of the stators of the motor(s) that is similar in value to the torque output before the change in the route of inverted current through the plurality of the stators.

Step Twenty One: If the duty cycle of the pulse width modulation of the inverter increases and approaches 100%, or reaches 100%, measure the voltage of the energy storage system. Calculate a quotient by using as the dividend, the measured DC voltage value, and as the divisor, the number of energy storage devices that compose a series circuit of energy storage devices within the measured energy storage system. If there are no series linkages of energy storage devices in the measured configuration of the energy storage system, then use a value of one for the divisor in determining the value of the quotient.

Step Twenty Two: For each of the dynamically controllable DC voltage configurations of the energy storage system, retrieve from data stored in a computer readable storage medium, the number of energy storage devices that compose a series circuit of energy storage devices for that specific dynamically controllable configuration of the energy storage system, which number is one or an integer greater than one.

Step Twenty Three: For each of the dynamically controllable DC voltage configurations of the energy storage system, calculate a product by multiplying the value of the retrieved number of energy storage devices that compose a series circuit of energy storage devices of that configuration of energy storage system by the quotient calculated in step twenty one and then further multiplying by the potential voltage drop factor as retrieved or calculated in step twenty.

Step Twenty Four: Alternatively, either measure the value of the peak voltage of the counter electromotive force of the rotating motor or, calculate the motor's peak voltage of back electromotive force derived as a product from multiplying the value of the peak voltage constant of the back electromotive force from the data as previously retrieved per step eleven by the value of the angular velocity whence determining the angular velocity of the motor while utilizing like kind units of measure (e.g., revolutions per unit of time, or radians per unit of time) for both those used in determining the voltage peak constant of the back electromotive force retrieved in step twenty and for those used in determining the angular velocity.

Step Twenty Five: Using the computer processor, and the data derived in step twenty four, determine which configuration of all the dynamically controllable DC voltage configurations of the energy storage system may derive the least DC voltage that is a greater DC voltage than the motor's peak voltage of back electromotive force.

Step Twenty Six: For the configuration of the energy storage system determined in the previous step twenty four, retrieve from data stored in a computer readable storage medium, the individual states of conductance of the plurality of the switches that control the route of current through the energy storage system for the configuration of the states of the plurality of the switches that may derive the DC voltage configuration of the energy storage system as determined in step twenty five.

Step Twenty Seven: Utilize the retrieved data derived in step twenty six cause a computer processor device to initiate the switch controller to implement the configuration of the individual states of conductance of the plurality of switches that control the route of current through the energy storage system so as to derive as a technical transformation the higher DC voltage configuration of the energy storage system.

Step Twenty Eight: Initiate the inverter circuitry utilizing the retrieved control program for operating the inverter at the then instant configuration of the energy storage system and of the stator circuitry and of the inverter circuitry so as to supply the stators with inverted voltage and current and to produce a torque output that is similar in value to the torque output just before implementing step twenty seven.

Step Twenty Nine: For as long as the motor continues to be in a propulsion mode proceed to repeat at step ten.

An example ET system that can be utilized for regenerative braking comprises: devices that dissipate energy thermally, including but not limited to friction brakes and/or electrically resistive elements; a motor/generator with a plurality of stators, or a system of motors/generators that can be provided motive torque from the drive train of a vehicle so as to generate electrical power; a braking system controller (that includes a computer processing device, computer readable and executable code, computer readable data storage medium) that regulates and allocates the degree of braking force derived by the generator(s) when operating in a regenerative braking mode and by control of the devices that dissipate energy thermally; an energy storage system, composed either with or, optionally, without a plurality of electrical energy storage devices; a plurality of switches to control the route of current through the plurality of the stators of a generator, or of a system of generators; a plurality of bidirectional switches to control the route of current through the energy storage system, if such electrical energy storage system is composed of a plurality electrical energy storage devices; a switch controller(s) that regulates the state of the conductance of the plurality of switches that control the route of current through the plurality of stators of the generator, or system generators, and/or regulates the state of conductance of the plurality of switches that control the route of current through the energy storage system; a rectifier; a power converter (or converters) that is (are) capable of boosting voltage, and/or, bucking voltage, and/or, boosting and/or bucking voltage; a device that provides a signal to a braking controller instructing to provide a value of braking force; an electrical energy storage management system that can determine and/or regulate the amount of electrical power that can be stored by the electrical energy storage system and which can communicate a signal to the braking controller of such maximum amount of electrical power that can be stored by the energy storage system and which signal also specifies the composition of such maximum electrical power in terms of DC voltage and amperage; a device to determine the angular velocity of the motor(s)/generator(s); data of the peak voltage constant of the back electromotive force of the motor/generator for each of the states of conductance of the plurality of switches that control the route of current through the plurality of the stators of the motor/generator, or system of motors/generators.

Below is an example method of operating an ET system in a regenerative braking mode:

Step One: Derive a signal to provide a value of braking force and communicate such signal to a braking controller.

Step Two: Discontinue inverting DC power so as to discontinue supplying motive power to the plurality of stators of a motor, or to system of motors.

Step Three: Initiate the brake controller to determine for which states of conductance of the plurality of the switches that control the route of current through the plurality of stators of the generator (or of stators of a system of generators) may provide for the highest safe operating voltage derived from the stators of the generator (or system of generators) whilst operating at the present angular velocity of the generator(s).

And, if the energy storage system has dynamically controllable routes of current through a plurality of its DC energy storage devices, cause the brake controller to determine the individual states of conductance of the plurality of the switches that control the route of current through the plurality of DC energy storage devices which safely provides for the highest regenerative electric power conversion and storage system efficiency when charging the energy storage system, while operating at the highest safe operating voltage derived from the stators of the generator (or system of generators) and whilst operating at the present angular velocity of the generator(s).

Utilizing such thence determined individual states of conductance of the plurality of switches, initiate the braking controller to activate the switch controller in order to implement such states of conductance of the plurality of the switches: that control the route of current through the plurality of stators of the generator, or the system of generators, and/or that control the route of current through the plurality of DC energy storage devices.

Initiate the DC energy storage management system to determine when utilizing the states of the conductance of the switches as determined in Step Three above, the maximum amount of electrical power that thence can safely be stored by the energy storage system and communicate a signal to the braking controller of such maximum amount of electrical power, and include in such signal the composition of such safe limits of electrical power in terms of DC voltage and amperage.

Utilizing the signaled data of the amount of braking force requested to be derived and of the maximum amount of electrical power that can safely be generated, converted and charged to the energy storage system [and the composition of such electrical power in terms of voltage and amperage], initiate the braking controller to determine a safe and most efficient power conversion storage and conversion system and determine the allocation as to the distribution of the braking force firstly applied to a regenerative force up to the maximum amount of electrical power that can safely be generated, converted and charged to the energy storage system, with any remaining required braking force being allocated to alternative braking force means, e.g., friction braking force, or thermal dissipating resistive loads. If the determination by the energy storage management system is that no additional electrical power can be stored to the electrical energy storage system, then allocate the amount of braking force requested safely to alternative braking forces means e.g., between an anti-torque motor-derived force and/or a friction braking force and/or thermal dissipating resistive loads; else, determine the amount of friction braking force that needs to be derived by calculating the following equation: Friction braking force=the greater of zero or (the amount of braking force being requested to be derived minus the maximum amount of electrical power that can safely be generated, converted and charged to the electrical energy storage system).

Initiate the switch controller to implement the instructions received from the braking controller so as to derive the determined state of conductance of the plurality of bidirectional switches that control the route of current through the plurality of the stators of the generator, or the system of generators, and/or, of the electrical energy storage devices.

To derive the determined safe and efficient distribution of braking force, initiate the braking controller to signal instructions to either: (a) the rectifier and the voltage bucking and/or boosting converter system(s), to initiate deriving the determined safe and efficient distribution amount of braking force derived by electrical power generation and to distribute such determined values and composition of electrical power generation to the electrical energy storage system and/or to a thermal energy dissipating system; (b) or, the motor controller, to initiate anti-torque motor-derived forces; (c) and/or, the friction braking devices to initiate friction braking.

For the duration of time that there is a continuing signal to apply a braking force, continually cause the electrical energy storage management system to: (1) redetermine if electrical power can be safely stored into the energy storage system and if so, to redetermine the safe compositions of the safe maximum electrical power in terms of voltage and current for each of the available states of the route of current through the DC energy storage devices; (2) monitor the rate of the angular velocity of the generator(s); (3) cause the braking controller to redetermine, if an enhanced regenerative electrical power conversion efficiency can safely be derived by utilizing the updated data of the distribution of regenerative braking force as to the safe compositions of maximum electrical power in terms of voltage and current that are available for charging the electrical energy storage system, and the angular velocity of the generator, by comparatively evaluating the safety of, and the power conversion and storage system efficiency for, each of the available combinations of the states of conductance of the plurality of the switches that control the route of current through the plurality of, either (a) the stators of the generator, or the system of generators, and/or (b) of the DC energy storage devices; and (4) determine as to the allocation of the total braking force requested between firstly allocating to a regenerative force up to the maximum amount of electrical power that can safely be generated, converted and charged to the electrical energy storage system, with any remaining required braking force thence being allocated to an anti-torque motor-derived force, and/or a thermal dissipating braking force mechanisms.

If the braking controller determines that an alternative combination of the state of conductance of the plurality of the switches can derive a safe operating voltage and an enhanced efficiency of the power generation, conversion and energy storage system then initiate the braking controller to implement a technical transformation of the state of conductance of the plurality of switches, to derive such safe operating voltage and more efficient power generation, conversion and storage system and to determine a reallocation of the distribution of braking force between a regenerative force, and/or to implement an anti-torque motor-derived force, and/or a friction braking force. When determining the reallocation of the distribution of a total braking forces that might arise from implementing an alternative enhanced combination of the state of the conductance of the plurality of the switches, cause the braking controller to implement limits to the change in the total amount of braking force to be derived that can arise from implementing a change in the state of the conductance of the plurality of the switches, so as not unsafely or unnecessarily invoke a change in the total amount of braking forces derived which change, if derived, might result in undue stress to the components of the drive train of the vehicle or initiate instability or loss of control of the vehicle, or invoke undue harsh change to the velocity of the vehicle, passengers, cargo or trailers.

Utilizing the signaled data of the amount of braking force requested to be derived and the maximum of electrical power that can be safely generated, converted and stored by the electrical energy storage system and the composition of such electrical power in terms of voltage and amperage, (a) pause the rectification and the power conversion of the electrical power being produced by the generator; (b) initiate the switch controller to implement the transformation of the state of conductance of the plurality of switches to derive the safe and most enhanced electric power conversion system efficiency; (c) reinitiate the rectification and the power conversion of the electrical power being produced by the generator and stored by the electrical energy storage system, which electrical power is not to exceed the determined maximum limits of voltage and current.

There is a simplified method of operation of an ET system, which is comparatively less efficient and rather crudely useful for the operation of an ET system wherein the energy storage system does not have the ability to dynamically and selectively reconfigure a plurality of similar voltage energy storage devices into series and/or parallel circuitries and thus does not have the ability to dynamically and selectively derive different voltage of supplied power to an inverter for a motor. Such method of operation comprises first determining a lowest safe operating voltage of output for the energy storage system, e.g., the cutoff voltage of a battery bank. Determine the peak voltage constant of the back electromotive force for each of the available symmetrical sets of configuration of the series and/or parallel circuits of the plurality of stators that can be derived by the selective state of conductance of the plurality of the states of switches that control the flow of current through the plurality of the stators. For each of the available symmetrical sets of configuration of the plurality of stators determine as a quotient value by dividing the lowest safe operating voltage of output for the energy storage system by the peak voltage constant of the bEMF for each such configuration of the plurality of the stators, which quotient value is the determined highest achievable angular velocity that can be realized by a motor (or system of motors) when operating in such configuration of circuitry of the plurality of the stators when the output voltage of the energy storage system is at its lowest safe operating voltage. Whilst operating the motor(s) in propulsive mode, monitor the angular velocity of the motor(s) and if and when the angular velocity of the motor(s) approaches such previously determined highest achievable angular velocity cause a computer processor to retrieve from data stored in a non-transient computer readable storage medium, for the next shorter configuration of the circuitry of the flow of current through the plurality of the stators, each the individual state of conductance of the plurality of switches that may derive as a technical transformation the next shorter configuration of the circuitry of the flow of current through the plurality of the stators. Retrieve from data stored in a non-transitory computer readable storage medium, the individual states of conductance of the plurality of the switches that control the route of inverted current through the plurality of the stators of a motor, (and/or of a plurality of the stators of a system of motors), and the control program for controlling the switches required to derive the technical transformation of an inverter circuitry that may result a configuration of stator circuitry with the next shorter route of inverted current through the plurality of the stators. Utilizing the data retrieved cause a computer processor to initiate the switch controller(s) to implement the configuration of the individual states of the conductance of the plurality of the switches that control the route of inverted current through the plurality of stators so as to derive as a technical transformation the configuration of the stator circuitry with the next shorter route of inverted current through the plurality of stators. Initiate the inverter circuitry utilizing the retrieved control program for operating the inverter at the then instant configuration of the stator circuitry and of the inverter circuitry so as to supply the stators with inverted voltage and current and to produce a torque output that is similar in value to the torque output just before implementing the implementation of the configuration of the next shorter route of inverted current through the plurality of the stators. If the motor's, angular velocity slows to below the maximum angular velocity of a next longer configuration of the circuitry of the flow of current through the plurality of the stators, then cause a computer processor to retrieve from data stored in a non-transitory computer readable storage medium, the individual states of conductance of the plurality of the switches that control the route of inverted current through the plurality of the stators of a motor (and/or of a plurality of the stators of a system of motors) and the control program for controlling the switches required to derive the technical transformation of an inverter circuitry that may result a configuration of stator circuitry with the next longer route of inverted current through the plurality of the stators. Utilizing the data retrieved cause a computer processor to initiate the switch controller(s) to implement the configuration of the individual states of the conductance of the plurality of the switches that control the route of inverted current through the plurality of stators so as to derive as a technical transformation the configuration of the stator circuitry with the next longer route of inverted current through the plurality of stators. Initiate the inverter circuitry utilizing the retrieved control program for operating the inverter at the then instant configuration of the stator circuitry and of the inverter circuitry so as to supply the stators with inverted voltage and current and to produce a torque output that is similar in value to the torque output just before implementing the configuration of the next longer route of inverted current through the plurality of the stators.

Any process descriptions or blocks in flow diagrams should be understood as representing steps and/or modules, segments, or portions of code which include one or more executable instructions for implementing specific logical functions or steps in the process, and alternate implementations are included within the scope of the embodiments in which functions may be executed out of order from that shown or discussed, steps omitted, steps added, or steps arranged substantially concurrently or otherwise, depending on the functionality involved, as may be understood by those reasonably skilled in the art of the present disclosure.

Note that reference to a processor (or processor device) may refer to a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations.

Executable code (or computer readable medium code or software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical medium or solid-state medium supplied together with or as part of other hardware, but may also be distributed in other forms. All such modifications and variations are intended to be included herein within the scope of this disclosure and protected by the following claims.

The invention claimed is:

1. An electronic transmission system to dynamically and selectively optimize a utilization of energy stored, consumed, and regenerated in an operation of a vehicle, the system comprising:
  a motor/generator or a system of motors/generators, wherein the motor/generator or the system of motors/generators have a plurality of stators;
  a first plurality of switch modules, wherein the first plurality of switch modules control a route for current, through the plurality of stators of the motor/generator or through the plurality of stators of the system of motors/generators, by selectively providing for parallel or series linkages between the plurality of stators and which first plurality of switch modules comprise an ability to selectively either conduct current in both directions or block current in both directions, and/or a second plurality of switch modules that selectively control the route of current between the inverter or inverters and the plurality of stators which second plurality of switch modules provide for selectively changing the route of current through the plurality of stators from a Wye circuit to an H bridge circuit, and which second plurality of switch modules comprise switch modules that can selectively conduct electricity in both directions or block current in both directions;

an inverter or inverters comprising a plurality of switches;

an energy storage system consisting of a plurality of similar voltage energy storage devices and a third plurality of switch modules whereby the third plurality of switch modules control a route for current charged or drawn through the energy storage system by selectively providing for parallel or series linkages between the plurality of similar voltage energy storage devices to selectively derive different voltages at positive and negative output terminals of the energy storage system for voltage input to the inverter or inverters or to facilitate receiving selective voltage charging power from a power source, and which the third plurality of switch modules comprise an ability to selectively either conduct current in both directions or to block current in both directions;

a device that measures angular velocity of the motor/generator or the system of motors/generators or a functional equivalent of the angular velocity of the motor/generator or the system of motors/generators, or a device to measure a peak voltage of a back electromotive force of the motor/generator or the system of motors/generators;

a device that measures a DC voltage across positive and negative output terminals of the energy storage system;

a non-transitory computer readable storage medium comprising computer readable code;

a computer processor device; and a switch controller or switch controllers in communication with the computer processor device and with the first plurality of switch modules and/or the second plurality of switch modules and the third plurality of switch modules and the plurality of switches of the inverter or inverters, wherein the switch controller or switch controllers selectively and dynamically control states of conductance of each of the first plurality of switch modules and/or the second plurality of switch modules and the third plurality of switch modules and of each of the plurality of switches of the inverter or inverters of the electronic transmission system.

2. The system of claim 1, wherein the third plurality of switch modules control the route for current charged or drawn through the energy storage system by selectively providing for parallel or series linkages between the plurality of similar voltage energy storage devices to selectively adjust the DC voltage at the positive and negative output terminals of the energy storage system for input to the inverter or inverters, or to receive charging power from a power source, and which third plurality of switch modules comprise switch modules that can selectively conduct current in both directions or block current in both directions comprising either of: MOSFETs, IGBTs, or B-TRANs.

3. A method of operating the system of claim 1, the method comprising:

initiating, by the computer processor device, the switch controller or switch controllers to implement a configuration of individual states of conductance of the third plurality of switch modules that control the route of current through the energy storage system to derive as a technical transformation a new DC voltage configuration of the energy storage system; and initiating the inverter or inverters to supply the plurality of stators with inverted voltage and current and to produce a torque output that is similar in value to a torque output just before implementing the configuration of the individual states of conductance of the third plurality of switch modules that control the route of current through the energy storage system to derive as a technical transformation the new DC voltage configuration of the energy storage system.

4. An electronic transmission system to dynamically and selectively optimize a utilization of energy stored, consumed, and regenerated in an operation of a vehicle, the system comprising:

a motor/generator or a system of motors/generators, wherein the motor/generator or the system of motors/generators have a plurality of stators;

a first plurality of switch modules, wherein the first plurality of switch modules control a route for current, through the plurality of stators of the motor/generator or through the plurality of stators of the system of motors/generators, by selectively providing for parallel or series linkages between the plurality of stators, and which first plurality of switch modules comprise an ability to selectively either conduct current in both directions or block current in both directions, and/or a second plurality of switch modules that selectively control a route of current between the inverter or inverters and the plurality of stators, which second plurality of switch modules provide for selectively changing the route of current through the plurality of stators from a Wye circuit to an H bridge circuit, and which second plurality of switch modules comprise switch modules that can selectively conduct current in both directions or block current in both directions;

a device that measures angular velocity of the motor/generator or the system of motors/generators, or a functional equivalent of the angular velocity of the motor/generator, or the system of motors/generators, or a device to measure a peak voltage of a back electromotive force of the motor/generator or the system of motors/generators;

an inverter or inverters comprising a plurality of switches;

an energy storage system comprising a plurality of similar voltage energy storage devices and positive and negative output terminals of the energy storage system for voltage input to the inverter or inverters;

a non-transitory computer readable storage medium comprising computer readable code;

a computer processor device; and a switch controller or switch controllers in communication with the computer processor device and with the first plurality of switch modules and/or the second plurality of switch modules and the plurality of switches of the inverter or inverters wherein, based on inputted measures comprising angular velocity, a functional equivalent of the angular velocity, or a peak voltage of a back electromotive force of the motor/generator or the system of motors/generators and an inputted measure of a voltage across the positive and negative output terminals of the energy storage system, the computer processor device is configured to execute the computer readable code to cause the switch controller or switch controllers to selectively and dynamically control states of conductance of each of the first plurality of switch modules and/or the second plurality of switch modules and of each of the plurality of switches of the inverter or inverters of the electronic transmission system.

5. A method of controlling the operation of the system of claim 1 or 4, the method comprising:
  determining, by a computer processor device, if a configuration of individual states of conductance, of the first plurality of switch modules and/or the second plurality of switch modules that control the route of current through the plurality of the stators to derive as a technical transformation a configuration of the plurality of stators with a new instant route of inverted current through the plurality of stators, will cause a state of conductance that derives from the plurality of stators an electromotive force that exceeds a safe operating voltage of the electronic transmission system when the motor/generator or the system of motors/generators functions respectively as a generator or a system of generators while operating at a present angular velocity of the generator or system of generators; and
  responsive to determining that the configuration of the individual states of conductance, of the first plurality of switch modules and/or the second plurality of switch modules that control the route of current through the plurality of the stators to derive as a technical transformation the configuration of the plurality of stators with a new instant route of inverted current through the plurality of stators, will cause a state of conductance that derives from the plurality of stators the electromotive force that exceeds the safe operating voltage of the electronic transmission system when the motor/generator or the system of motors/generators functions respectively as a generator or a system of generators while operating at a present angular velocity of the generator or system of generators, inhibiting, by the computer processor device, the switch controller or switch controllers from implementing a configuration of the individual states of conductance of the first plurality of switch modules and/or the second plurality of switches that control the route of current through the plurality of the stators to derive as a technical transformation the configuration of the plurality of stators with a new instant route of inverted current through the plurality of stators that causes a state of conductance that derives from the plurality of stators the electromotive force that exceeds a safe operating voltage of the electronic transmission system when the motor/generator or the system of motors/generators function respectively as a generator or a system of generators while operating at a present angular velocity of the generator or system of generators.

6. The system of claim 1 or 4, further comprising a DC voltage converter comprising a buck/boost converter, and/or a boost converter, and/or a buck converter.

7. The system of claim 1 or 4, further comprising a device or devices that provide a signal for making preparations to activate the electronic transmission system and for providing a requested amount of voltage and inverted current to be provided to the plurality of stators of the motor/generator or the plurality of stators of the system of motors/generators.

8. The system of claim 1 or 4, wherein the first plurality of switch modules and/or the second plurality of switch modules comprise switch modules that can selectively conduct current in both directions or block current in both directions comprising either of: MOSFETs, IGBTs, or B-TRANs.

9. The system of claim 1 or 4, wherein the motor/generator or the system of motors/generators comprising a plurality of stators comprise a low inductance, permanent magnet rotor, motor/generator, or a low inductance system of permanent magnet rotor motors/generators.

10. The system of claim 1 or 4, wherein the motor/generator or the system of motors/generators comprise a plurality of ironless stators.

11. The system of claim 1 or 4, wherein the motor/generator or the system of motors/generators comprise axial flux machines.

12. A method of operating the system of claim 1 or 4, the method comprising:
  initiating, by the computer processor device, the switch controller or switch controllers to implement a change in a configuration of individual states of conductance of the first plurality of switch modules that control a route of inverted current through the plurality of stators to derive as a technical transformation a configuration of the plurality of stators with a new instant route of inverted current through the plurality of stators and/or of the second plurality of switch modules that selectively control a route of current between the inverter or inverters and the plurality of stators, which second plurality of switch modules provide for selectively changing the route of current through the plurality of stators from a Wye circuit to an H bridge circuit, and which second plurality of switch modules comprise switch modules that can selectively conduct electricity in both directions or block current in both directions; and
  initiating the inverter or inverters to supply the plurality of stators with inverted voltage and current and to produce a torque output that is similar in value to a torque output just before implementing the change in the configuration of the individual states of conductance of the first plurality of switch modules and/or the second plurality of switch modules that control the route of inverted current through the plurality of stators to derive as a technical transformation the configuration of the plurality of stators with the new instant route of inverted current through the plurality of stators.

* * * * *